(12) United States Patent
Hawkins et al.

(10) Patent No.: US 10,867,311 B2
(45) Date of Patent: *Dec. 15, 2020

(54) ROBUST MULTICHANNEL TARGETING

(71) Applicant: Accenture Global Services Limited, Dublin (IE)

(72) Inventors: Christopher John Hawkins, San Jose, CA (US); Leeann Chau Tuyet Dang, Santa Clara, CA (US); David Tong Nguyen, Newark, CA (US); Hyon S. Chu, San Francisco, CA (US); Serena Tsiao-Yi Cheng, San Carlos, CA (US); Bryan Michael Walker, Sunnyvale, CA (US); Ziqiu Li, San Jose, CA (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,755

(22) Filed: Jan. 8, 2019

(65) Prior Publication Data

US 2019/0147467 A1 May 16, 2019

Related U.S. Application Data

(63) Continuation of application No. 14/835,187, filed on Aug. 25, 2015, now Pat. No. 10,198,738.
(Continued)

(51) Int. Cl.
*G06Q 30/02* (2012.01)
*G06Q 50/00* (2012.01)

(52) U.S. Cl.
CPC ..... *G06Q 30/0204* (2013.01); *G06Q 30/0271* (2013.01); *G06Q 50/01* (2013.01)

(58) Field of Classification Search
CPC ............................. G06Q 10/00; G06Q 40/06
(Continued)

(56) References Cited

U.S. PATENT DOCUMENTS

| 5,848,396 | A | 12/1998 | Gerace |
| 7,315,882 | B1 * | 1/2008 | Koch ................... G06Q 10/109 |
| | | | 709/206 |

(Continued)

OTHER PUBLICATIONS

First Examination Report issued in corresponding Australian Application No. 2015218438, dated May 30, 2016, pp. 1-5, IP Australia, Phillip, Australia.
(Continued)

*Primary Examiner* — Romain Jeanty
(74) *Attorney, Agent, or Firm* — Brinks Gilson & Lione

(57) ABSTRACT

A computer system may access an attributization rule and convert, based on the attributization rule, profile data into attributes for a robust recipient profile. The system may identify, based on tag logic, tags that are associated with the attributes. The tag logic may include instructions to compare the attributes with predetermined attributes associated with the tags. The system may map the identified tags to the recipient identifier. The system may perform communication with a mobile device based on the robust recipient profile and a real-time location of the mobile device. To perform the communication, the system may monitor the plurality of data channels for data comprising real-time location information for the mobile device. The system may determine the mobile device is proximate to a physical object that is associated with the tag and the system may transmit offer information to the mobile device.

20 Claims, 14 Drawing Sheets

Related U.S. Application Data

(60) Provisional application No. 62/041,315, filed on Aug. 25, 2014.

(58) Field of Classification Search
USPC .......................................... 705/7.33
See application file for complete search history.

(56) References Cited

U.S. PATENT DOCUMENTS

| | | | |
|---|---|---|---|
| 8,538,786 | B2 | 9/2013 | Linehan |
| 8,990,106 | B2 | 3/2015 | Parker et al. |
| 9,245,257 | B2 | 1/2016 | McConnell |
| 9,684,652 | B2 | 6/2017 | Connor et al. |
| 9,757,644 | B2 | 9/2017 | Rose et al. |
| 2002/0008622 | A1* | 1/2002 | Weston .................. G06F 16/58 340/572.1 |
| 2003/0105823 | A1* | 6/2003 | Ally .................. H04N 1/32416 709/206 |
| 2004/0201738 | A1* | 10/2004 | Moores, Jr. ........ H04N 1/00137 348/231.2 |
| 2004/0260605 | A1* | 12/2004 | McIntyre ........... G06Q 30/0239 705/14.39 |
| 2006/0124734 | A1* | 6/2006 | Wallerstorfer ....... G06Q 20/401 235/382 |
| 2007/0123280 | A1* | 5/2007 | McGary .................. H04L 51/18 455/466 |
| 2007/0252001 | A1* | 11/2007 | Kail .................... G07C 9/00087 235/380 |
| 2009/0055246 | A1* | 2/2009 | Jung ...................... G06Q 30/02 705/35 |
| 2009/0132345 | A1 | 5/2009 | Meyssami et al. |
| 2009/0265224 | A1 | 10/2009 | Tarr et al. |
| 2013/0185153 | A1 | 7/2013 | Howcroft |
| 2014/0129457 | A1* | 5/2014 | Peeler .................. G06Q 10/067 705/317 |
| 2014/0136105 | A1 | 5/2014 | Chakraborty et al. |
| 2014/0351098 | A1 | 11/2014 | Shafer et al. |
| 2015/0248647 | A1 | 9/2015 | Goel et al. |
| 2016/0171509 | A1 | 6/2016 | Fanous et al. |

OTHER PUBLICATIONS

Examination Report No. 2, issued in Australian Patent Application No. 2017203106, dated Apr. 4, 2019, pp. 1-5.

* cited by examiner

| Customer | Tag |
|---|---|
| bryan | male |
| bryan | health conscious |
| bryan | San Jose |
| bryan | slim-fit |
| bryan | college educated |
| bryan | business traveller |
| bryan | holiday traveller |
| bryan | late twenties |
| chris | male |
| chris | San Jose |
| chris | slim-fit |
| chris | college educated |
| chris | holiday traveller |
| chris | social media active |
| chris | social media influencer |
| chris | early twenties |
| chris | brand engaged |

Figure 8

| Attribute | Category | Value | Amount | Normalized Amount |
|---|---|---|---|---|
| Color | chino | Emerald | 0.5 | 0.5 |
| Color | chino | Navy | 0.5 | 0.5 |
| Color | denim | Black | 0.3333 | 0.3333 |
| Color | denim | Dark Blue | 0.3333 | 0.3333 |
| Color | denim | Indigo | 0.3333 | 0.3333 |
| Color | coat | Black | 1 | 1 |
| Color | dress shirt | Black | 0.1111 | 0.1111 |
| Color | dress shirt | Blue | 0.1111 | 0.1111 |
| Color | dress shirt | Green | 0.1111 | 0.1111 |
| Color | dress shirt | Parsley green | 0.1111 | 0.1111 |
| Color | dress shirt | Purple | 0.2222 | 0.2222 |
| Color | dress shirt | Ruby | 0.2222 | 0.2222 |
| Color | dress shirt | White/blue | 0.1111 | 0.1111 |
| Color | casual shirt | Olive | 1 | 1 |
| Color | tee | Deep highland purple | 1 | 1 |
| Color | sweater | Black | 0.2 | 0.2 |
| Color | sweater | Burgundy | 0.2 | 0.2 |
| Color | sweater | Navy | 0.4 | 0.4 |
| Color | sweater | grey | 0.2 | 0.2 |
| ColorBrightness | chino | chino | 0.5375 | 0.5375 |
| ColorBrightness | denim | denim | 0.2667 | 0.2667 |
| ColorBrightness | coat | coat | 0 | 0 |
| ColorBrightness | dress shirt | dress shirt | 0.5744 | 0.5744 |
| ColorBrightness | casual shirt | casual shirt | 0.4 | 0.4 |
| ColorBrightness | tee | tee | 0.9 | 0.9 |
| ColorBrightness | sweater | sweater | 0.16 | 0.16 |
| Price | chino | chino | 49.3 | 0.493 |
| Price | denim | denim | 58.3667 | 0.583667 |
| Price | coat | coat | 165 | 1.65 |
| Price | dress shirt | dress shirt | 60.1705 | 0.601705 |
| Price | casual shirt | casual shirt | 79.5 | 0.795 |
| Price | tee | tee | 29.5 | 0.295 |
| Price | sweater | sweater | 44.196 | 0.44196 |
| OnPromotion | chino | FALSE | 0.5 | 0.5 |
| OnPromotion | chino | TRUE | 0.5 | 0.5 |
| OnPromotion | denim | FALSE | 0.6667 | 0.6667 |
| OnPromotion | denim | TRUE | 0.3333 | 0.3333 |
| OnPromotion | coat | TRUE | 1 | 1 |

| Customer ID | Product Key 1204 | Recommendation Score 1206 |
|---|---|---|
| 0 | 10: Slim-fit Soft-Wash Green Plaid Shirt | 0.78 |
| 0 | 11: Soft-wash crew-neck long-sleeve tee | 0.78 |
| 1202 → 0 | 12: Slim-fit Non-Iron Tattersail Shirt | 0.83427 |
| 0 | 13: Vintage straight dark grey jean | 0.80652 |
| 0 | 14: Ribbed Half-Zip Pullover | 0.84511 |

Figure 12

ROBUST MULTICHANNEL TARGETING

RELATED APPLICATIONS

This application is a continuation of U.S. application Ser. No. 14/835,187, filed on Aug. 25, 2015, which claims priority to U.S. Provisional Application No. 62/041,315, filed on Aug. 25, 2014, both of which are incorporated herein by reference in their entirety.

TECHNICAL FIELD

This disclosure relates to a complex system architecture and analytics engine for building, developing, and applying robust recipient profiles to real-world solutions. This disclosure also relates to technical analysis leading to generation of recipient-specific custom metadata based on analysis of robust recipient profiles.

BRIEF DESCRIPTION OF THE DRAWINGS

FIG. 8 shows an example set of customer tags within a customer genome.

FIG. 11 show an example table visualization of a customer genome.

FIG. 12 shows an example set of customer offer recommendations.

DETAILED DESCRIPTION

Figure 1:
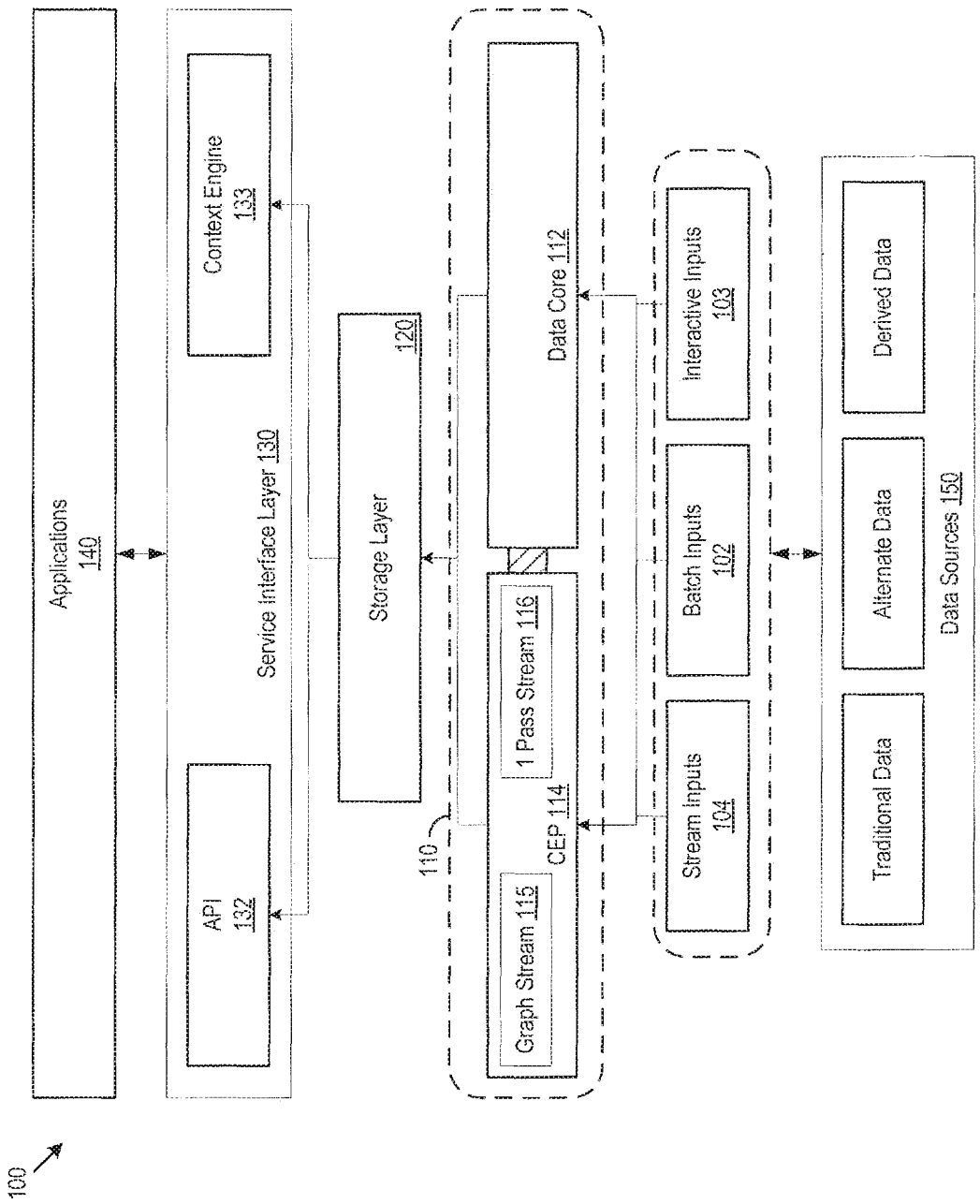
FIG. 1 shows an example customer genome system architecture.

In customer interactions, in many cases, businesses use computer systems to track past purchases of customers to glean knowledge of their customers' daily lives. In some cases, this knowledge allowed businesses to tailor their service and product offerings to the needs of their customer by analyzing the frequency and recurrence of past customer purchases. However, with the advent of regional and global businesses, personalized customer intelligence is a significant technical challenge to maintain and implement. Moreover, in the digital, e-commerce and social media era, customers may never physically or personally interface with a retailer or service provider, but may nevertheless expect a highly personalized customer service. It may be advantageous for businesses to build customer engagement communication technologies to attract customers who, through their own use of modern technology, are deeply connected and highly informed. Businesses may strive to form a feedback loop of continuous, relevant digital connections with customers both before and after a purchase.

In the past, businesses have relied on customer segmentation and association rules to guide their sales and service strategies. Customer segmentation balances the desire for personalized experiences with the ability to profitably scale, and seeks to identify similar groups of target customers based on certain attributes of the target customer. For example, businesses may perform demographic segmentation on customers, identifying "single males between 20-30 years of age," or categorical segmentation, labeling customers as "soccer moms" or "upper crust." Association rules on the other hand seek to identify related customer behavior, for example, customer purchasing habits or trends. For example, by looking at purchase history data of customers the system may correlate or otherwise associate the purchase of one product with another and may use this information to predict future purchase behavior of a particular customer. As a more specific example, association rules may link the purchase of ketchup with the subsequent purchase of hamburger buns.

However, segmentation is generally only effective on large populations where observational data for a given parameter exists for each member of the population. But such data may not always be available, or may be expensive to capture. Moreover, traditional segmentation may never be truly personalized as it fundamentally relies on approximating a customer's preferences based on the preferences of a broader population segment. Similarly, association rules may only provide limited insight regarding customer behavior, and have a tendency to reinforce customer behavior. These issues are particularly significant in today's digital era, where customers are deeply connected through social media, highly informed via the internet, and constantly on-the-go with the ability and desire to access information using mobile computing devices. The practice of distilling millions of customers into generalized sub-categories using customer relationship management information, which is based on one-time transactions in a traditional purchase funnel, is no longer sufficient.

Accordingly, there is disclosed digital systems and methods for generating a robust recipient profile that involve receiving data from a plurality of data channels, where the received data comprises batch data and stream data, and processing the received data to generate the robust recipient profile. The received data may include traditional data, alternate data, or a combination thereof. Processing the received data may involve matching the received data to a recipient and assigning a recipient identifier to the received data, and analyzing a selected portion of the received data to determine one or more attributes of the recipient. The determined attributes of the recipient may be ranked, and a determination may be made regarding which of the attributes should be tagged to the recipient. Corresponding tags may then be assigned to the recipient. The data channels may also be monitored for any additional data.

The data processing performed on the received data may further include cross-referencing the selected portion of the received data with pre-analyzed data, and performing reconciliation of data received from multiple data sources. Reconciliation may involve determining whether one or more data objects in the received data contain information regarding a common attribute of the recipient and determining a level of trust of the one or more data objects based on the data source of that object, and based on the determined level of trust, the common attribute of the recipient may be adjusted. A determination may also be made as to whether a real-time update flag is present in the received data and where a real-time update flag is present, the robust recipient profile may be updated in real-time, but where a real-time update flag is not present the robust recipient profile may be updated through a batch update. The robust recipient profile may be updated periodically, on-demand, or in response to a trigger.

The disclosed digital systems and methods may also determine a recipient-specific custom metadata recommendation based on the robust recipient profile, which may involve retrieving metadata and an attribute configuration file from a metadata database, where the metadata comprises a set of generalized metadata. The determined attributes of the customer may be matched with the metadata based on the attribute configuration file to determine relevant recipient-specific custom metadata, and a fit factor may be assigned based on a level of correlation between the relevant recipient-specific custom metadata and the determined attributes of the recipient. The relevant recipient-specific custom metadata may then be categorized based on the assigned fit factor and ranked based on a significance of the relevant recipient-specific custom metadata to a business. The recommendation may ultimately be presented to the recipient.

Categorizing the relevant recipient-specific custom metadata may itself involve, determining whether particular metadata in the metadata comprises a contextual parameter and determining whether the particular metadata is valid by assessing whether the contextual parameter has been satisfied. The particular metadata may be categorized as contextual metadata based on this determination. Categorizing the recipient-specific custom metadata may also involve identifying regular and extended recipient-specific custom metadata, where regular recipient-specific custom metadata meets or exceeds a first predetermined fit factor threshold, and where extended recipient-specific custom metadata exceeds a second predetermined fit factor threshold but falls below the first.

Determining a recipient-specific custom metadata recommendation may additionally involve deriving a transaction mapping based on the robust recipient profile, where the transaction mapping has one or more nodes, corresponding to particular metadata in the metadata, and one or more edges, where each edge has a weight that reflects the conditional probability of customer acceptance of a particular metadata corresponding to a second node based on customer acceptance of a particular metadata corresponding to a first node. The determined attributes of the recipient may then be matched against the one or more nodes in the derived transaction mapping, where a matching node indicates recipient acceptance of the particular metadata. One or more of the relevant recipient-specific custom metadata may be categorized as extended recipient-specific custom metadata based on an identification of nodes that have a common edge with the matching node and a determination that the weight of the common edge exceeds a predetermined probability threshold.

The disclosure below discusses exemplary architectures with accompanying technical analysis techniques for organization and implementation of customer information using a customer genome to illustrate the present innovations. The customer genome may be thought of as the digital DNA of customers, a natural evolution of market and top-down customer segmentation. The customer genome may be a complex data structure that includes a set of attributes with associated probabilities that may be derived from observational data received from real-time and batch data sources, which may be processed using statistical or mathematical models, along with contextual attributes that may be included in the data structure for variable amounts of time based on the time of data ingestion. The customer genome may be built from traditional and alternate data sources such that it represents a truly individualized portrait of a customer, which may be used as the basis for providing personalized lifestyle or living services. The derived data may identify distinctive attributes or markers that the business may leverage to create targeted approaches for customer engagement that provide a deeper and more continuous connection with customers, weaving brands and products seamlessly into their everyday lives.

With customer genomes, businesses may develop a deeper understanding of individual customer needs, preferences and lifestyles. They may also streamline and manage inventory, distributing products to regions where clusters of customer genomes reside. Businesses may also use the derived data to convert insights into actions, for example, inferring future product and service needs, or personalizing offers to individual customers as they shop online or via their mobile device. In this way, businesses may leverage this information to better satisfy customer demands, strengthen brand loyalty and drive sales, and from the customers' perspective, this results in a personalized and effortless consuming experience as they go about their daily lives. Businesses may also use the genome to suggest new products and services just outside a customer's comfort zone, or generate upselling opportunities that may enhance the customer experience and advance certain business goals.

In various implementations, the customer genome may include individualized or targeted information to facilitate generation of offerings, e.g., a product, service, promotion, or other opportunity for engagement, to a customer. The genome can be used to provide a business with information of interest about a consumer, where the information of interest may vary, for example, from demographic information to an affinity for certain product traits. The customer genome may be constructed from traditional and alternate data sources, which may be used to create derived data about consumers for inclusion in the customer genome. The data sources may include, for example, existing data sources, such as social media profiles or consumer information databases, real time data collection from sensors or other monitoring devices, such as mobile device location systems, and/or other data sources.

In various implementations, derived data may include information about how a customer prefers to engage with a business, price sensitivities, favorite channels (such as, online, mobile, or in-store) and potential influencers (such as, celebrities, brands, family or friends). The derived data may also include customer affinity preferences. As one example of derived data, a clothing retailer may be interested in derived data detailing clothing size and style preferences of an individual based on transactional records. Derived data may be formed by analyzing transactional activity and social media information to identify customer interests and lifestyles. As another example, a business can use the derived data of a target customer to infer preferences in music, entertainment or social activities. In an example scenario, a banking customer may "like" a particular band on her social media profile. When her bank learns the band is coming to the customer's town for a concert, the bank may provide budget recommendations to help the customer save money for the tickets. In this way, the bank may tailor content and extend services to support the specific interests or needs of an individual customer. Increased customer loyalty may result from such interactions.

The emergence of digital commerce has resulted in a dramatic shift regarding how customers interact and engage with businesses, and businesses are only now beginning to understand these changes. Customers may, for instance, exhibit preferences regarding different types of marketing and promotion, for example, indicating a preference for a particular delivery channel (e.g., e-mail or text message) or a particular response trigger (e.g., 70% off sale, or a limited quantity offer). Traditional marketing campaigns, for example, those focused on sending offers via mail, provided little information regarding these customer preferences, as tracking and feedback regarding these offers was unavailable or expensive to obtain. As businesses have only recently been able to track and capture this information, insights regarding this sort of customer behavior, and how best to respond to it, have been limited. These new sources of information regarding customer interactions may be integrated into the analysis behind forming the customer genome, and the customer genome, through its derived data, may be able to better capture customer preferences regarding customer marketing, channel and engagement preferences.

In various implementations, dynamic modifications may be made to the customer genome. In some implementations the genome may be altered in near-real-time or real-time as information is ingested into the system. In this way, offers that are generated based on the genome may be immediately responsive to the needs of a customer. For example, a customer may be sent a discount on apparel if he/she walks by or idles nearby a display in a clothing store. As another example, a customer may send a message to friends on social media letting them know about a party that they may be hosting that evening ("Barbecue at my place at 8"), and in response an offer may be sent to the customer for party supplies or various meat products.

In various implementations, the customer genome may support contextual offer provision. Customers may be more likely to respond to experiences that are properly situated in their current context, and may be more likely to accept promotions that are presented at the point of decision instead of in an unrelated context. For example, the customer may be sent an offer for camping supplies responsive to a post made on a social media site about an upcoming camping trip. As another example, a customer may be sent an offer for a discount on electronic purchases responsive to the customer exploring the electronics section of a store.

The customer genome may also adapt to the customer as their lives change. In some implementations, dynamic updates to the customer genome may allow the genome to adapt to the customer as their preferences change and may facilitate detection of and/or responsibility to a milestone or life changing event in a customer's lifecycle. By way of example, these events may include the birth of a child, a new home purchase, attending a new educational program, getting a new job, or other significant life event. In some cases, customers may be more receptive to change their pattern of behavior based on the occurrence of such an event. This may make these events fortuitous times of customer engagement for reasons, such as, customer acquisition, retention, and/or upselling.

As noted earlier, the customer genome may be leveraged to tailor product and service offerings to a particular customer. Traditional marketing campaigns rely on static data, for example, CRM data, which is typically aggregated and sent to a marketing team to develop a particular marketing campaign. In many cases, it may be several weeks or months before a marketing campaign is rolled out to address specific customer preferences or behavior. The customer genome, in contrast, may allow for marketing campaigns that are both contextually responsive and temporally relevant. For example, in some implementations, a generalized list or pool of campaigns or promotions may be created, and specific offers may be selected from the pool for an individual customer, automatically, based on the attributes and preferences reflected in the customer genome. Moreover, in traditional marketing campaigns, the marketer or business typically specifies certain parameters for developing a marketing campaign. The customer genome may be used to proactively suggest or recommend marketing campaigns, and may do so by taking into account certain business goals. In an example scenario, a business may be looking to increase sales in a particular product category or department. Based on the customer genome, it may be determined that a particular customer, or group of customers, is not engaging with the business because they purchase the product elsewhere. The customer genome, however, may also indicate that this customer is particularly price conscious, and a promotional sale or discount may be recommended for offering to the customer. In some implementations, the customer genome system may also suggest items or services to a consumer from a list of offerings that are slightly outside of his/her normal buying habits, in an effort to have a customer 'branch-out' from the customer's previous buying patterns.

Although techniques and architectures are discussed in terms of customer interaction, the architectures and techniques may be applied in various contexts such as logistics, business intelligence, market analysis, or analysis in other fields. The architectures and techniques may be applied in virtually any field where real-time or near-real-time analytics may present an advantage. The techniques and architecture may be applied in virtually any field that uses data from different data sources that contain information regarding aspects or characteristics of the same object or entity.

FIG. 1 shows an example customer genome system architecture 100. In the example customer genome system architecture 100, data may be received by the analysis logic 110. The data may be received by the architecture 100 as streaming data 104, interactive data 103, and/or batch data 102. The analysis logic 110 may include a data core 112 and complex event processing (CEP) system 114. The data core 112 may receive data from data sources for processing to support construction of the customer genome as described below. The data core 112 may be responsible for creating the customer genome and performing updates. The data core 112 may also produce offer recommendations using an offer recommendation algorithm.

The data core 112 may be implemented, for example, using a Hadoop distribution, which provides frameworks for reliable, scalable, distributed computing and data storage. As a more specific example, the data core 112 may be implemented with the Cloudera Hadoop distribution, using YARN, the architectural center of Hadoop, and HDFS, Hadoop's distributed filing system. The architecture is not thus limited and alternative computing and storage frameworks may be used.

The CEP system 114 may receive streaming data 104 for real-time and/or near-real-time processing with regard to inclusions or changes in the customer genome. In various implementations, the batch data 102 processing may be implemented using computing frameworks (e.g., Apache Spark, an open-source framework) that support stream processing for the CEP system 114 (e.g., Spark Streaming module). Streaming data 104 may be delivered using a data stream that supports queueing. For instance, Kafka streams may be used to deliver streaming data 104, and Spark Streaming may be used to process these incoming Kafka streams.

The data core 112 and CEP system 114 may use the computing framework and stream processing modules (e.g., Spark and Spark Streaming) to process incoming data and create a unified image of the customer, where converted customer attributes form part of the customer genome. The data core 112 and CEP system 114 may also process streaming data 104 in the provisioning of a particular offer. The customer attributes may be determined based on certain business rules, which may involve binary comparisons (e.g., True/False rules) or more complex analytics, for example, running the data against a particular model and assessing the resultant outcome. The data core 112 may also apply machine learning and natural language processing techniques to extract information from the raw data that is received.

In some implementations, the CEP system 114 may parse incoming streaming data 104 to detect specific items that may warrant an immediate change in a customer genome or provisioning of a particular offer. For example, the CEP system 114 in processing streaming location data may recognize that a customer has entered a particular geographic location or business location, which may trigger a change in the customer genome or cause an offer to be extended to the customer. In a more complex scenario, the CEP system 114 may process streaming location data to track a customer as they move around a store, and may be able to better understand how the customer is moving. For example, the CEP system 114, in processing location data, may determine that the customer walked through a certain path (e.g., from the entrance to aisle five, then through aisle eight) and stopped at a particular location (e.g., ultimately arriving at the frozen foods section). In order to avoid inundating the customer with offers, which could alienate the customer, the CEP system 114 may only trigger a response when the customer stops, or is stationary, for a specified period of time. In some cases, the CEP system 114 can create or update a genome on its own. In some cases, the real-time processing capabilities of the CEP system 114 may be reserved for priority updates and customer genome creation.

Customer attributes in the customer genome may also be compared against configurable tag rules, which may allow for tagging of customers with labels that may be valuable from a marketing perspective. Customer tags may be attributes that describe the customer and may be used to determine when to provide offers to customers. For example, customer tags may be used to identify contextual cases that might suggest making an offer, which otherwise failed to meet the metrics for provision. While traditional marking methods for marketing campaigns rely on top-down segmentation for tagging of customers, these tags tend to be stationary and apply to the same group of customers for a relatively long period of time. The architecture, in contrast, may support more dynamic tagging, where tags may have a temporal parameter such that tags may only last for a prescribed period of time. For instance, tags may be applied based on contextual attributes of a customer, for example, identifying that a customer is in a store in a particular area ("near dairy products" or "in aisle five"), where offers may be generated based on these more ephemeral tags. Marketing campaigns may make use of tags having temporal parameters, along with tags that are based on historical data, to trigger interactions that are both personalized and contextually relevant. By way of example, a promotional offer for a product (e.g., "$1 dollar off a gallon of milk") may be sent to a customer having a tag indicating that they are in a particular area of the store (e.g., "entering the dairy section") and a tag indicating that they have historically purchased products that are located in this area (e.g., "prefers low fat milk"). FIG. 8 shows an example set 800 of customer tags. The customer tag set entries 802 may include an indication 804 of the customer associated with the tag entry and a tag value 806.

The storage layer 120 may support storage of customer genomes, customer tags, and/or offer recommendations. In various implementations, the storage layer 120 may be an in-memory database. In other implementations, the customer genome system architecture 100 may substitute an in-memory database for a distributed database, for example, using the Apache Cassandra cluster, which may reduce costs relative to in-memory storage. In some implementations, the database may be implemented using a relational database which may allow for changes as incoming data is received and analyzed.

In various implementations, the database may be modelled in such a way that data sources (e.g., streaming data 104 and batch data 102) are segregated from one another, so that different data sources may be processed independently. For instance, social media information (e.g., basic profile information and prior Facebook likes) may be uploaded as batch data 102, which may be processed and stored in one portion of the database, and social media streams (e.g., real-time conversations) may be received as stream data 104, which may be processed and stored in another portion of the database. In this way, changes to the customer genome may be written non-destructively, based on ingested data (e.g., stream data 104 or batch data 102), to respective portions of the database. This may be beneficial in instances where data is continuously ingested (e.g., stream data 104) over the speed of reading. In such implementations, where data source integrity in the database is maintained individually, information may be combined or aggregated when the customer genome is ultimately read out (e.g., when requested by the service layer 130). Database records may also be partitioned by a customer ID, which may be useful in high performance marketing automation use cases. Data may be redundantly stored in an aggregated form and may be read optimized for data analytics use cases.

The service interface layer 130 may include an API 132 and a context engine 133. The application programming interface (API) 132 may define the interfaces (e.g., function calls) for applications 140. For example, an application 140 may want the set of the most significant attributes for a particular customer. In one implementation, for example, the application may request a list of the top three affinities (i.e., flavor preferences) for a particular customer by invoking the following request: "GET genome-host:8080/api/v1/affinities?customer-key=1&affinity-type=flavors&max-affinities=3" which may return the following customer attribute data set: {"affinities": [{"value": "raspberry", "strength": 0.463},{"value": "vanilla", "strength": 0.108}, {"value": "chocolate", "strength": 0.078}]}. As another example, an application 140 may want a set of interactions (i.e., offers) that may be available for recommendation to a customer. In one implementation for example, the application 140 may request the most relevant offer (i.e., coupon offer) for a particular customer by invoking the following request: "GET genome-host:8080/api/v1/interactions? customer-key=1&interaction-type=coupons&max-interactions=1"

which may return a particular offer: {"interactions": [{"key": 1213, "href": "/api/v1/interactions/1213"}]}.

The context engine 133 may be implemented in the service interface layer 130 and may derive contextual states of a customer by applying context rules to stored data retrieved from the storage layer 120, incoming data (e.g., stream data 104), or API request data accompanying requests received through the API 132. By way of example, the following API call may provide location information for a particular customer: "PUT genome-host:8080/api/v1/context?customer-id=1&context-key=location&context-value=3". The derived contextual states may be used to enable contextually specific marketing efforts, for example enabling real-time marketing automation. By way of example, the following API call may request the first ten customers that are currently at a particular location (e.g., the grocery store) and have a particular tag (i.e., "chocolate lovers"): "GET genome-host:8080/api/v1/customers?context-key=location&context-value=3&tag=chocolate%20lover&max-match=10" which may return the following customer data set: {"customer-matches": [1, 2, 3, 4, 10, 11, 24, 36, 37, 39]}.

In some implementations, the service interface layer 130 may be implemented as a REST API 132, which may be built using Node.js, where communication with the underlying systems may be abstracted by the REST API 132. The service interface layer 130 may be scalable, with optional limiting of functions on a per node basis. The service interface layer 130 may interface with the lower layers (e.g., the data core 112 and CEP system 114) and may handle most data analytic use cases, and may orchestrate real-time marketing automation or campaign targeting.

Customer interactions, in general, may be characterized by a set of metadata that associates the interaction with targeting criteria. The metadata may point to a particular marketing campaign, content management system, or other integration (e.g., integrated social media platform). The targeting criteria, in turn, may reference particular customer attributes, tags or contextual information stored in the customer genome. The different customer interactions may be enabled by custom or commercial integrated systems (e.g., twitter integration or SMS messaging integration), and the targeting criteria may be handled by the customer genome and context engine 133. By way of example, an automated message (e.g., a tweet) may be sent by an integrated social media platform in response to a message (e.g., a tweet) received as a streaming data source. If, for example, the targeting criterion includes both a context criteria for a specific situation and a customer tag criteria (e.g. "context: having a party" and "customer tag: 'social media influencer'"), a particular offer may be sent to the customer. In various implementations, the execution of a marketing campaign, having certain targeting criteria, in the service layer 130 may trigger a request for the current customer genome, which may result in the data core 112 building or updating the customer genome.

As explained above, the database may be modelled such that data sources are processed and stored separately, and may be assembled when a request for the customer genome is received. More generally, data in the customer genome may be stored in mutation groups depending on how it may be modified. When a request for the customer genome is received, the different mutation groups may be read and a resultant value may be calculated, for example, by averaging the values of the different mutation groups or by adding the values of the different mutation groups together. In the case of data sources that are stored separately, processing the data sources may provide similar or related information, which may need to be combined together. For example, the result of processing batch data sources (e.g., in-store transaction history) may be combined with the result of processing a stream data source (e.g., streaming e-commerce transactions) to calculate a cumulative result (e.g., the total amount spent) or an averaged result (e.g., a raspberry flavor preference).

In other implementations, for example, where campaign targeting may respond to ingested data (e.g., stream data 104), the service layer 130 may periodically check to see if additional data has been received. For instance, a marketing campaign may be set to respond to social media messages (e.g., a Twitter message), for example, those having a particular identifier (e.g., "# summersale"), by providing an offer to the customer. Because such marketing campaigns may not be contextually limited (e.g., as in a limited-time offer), periodically checking the social media stream data 104, for example, at five or ten minute intervals, may be sufficiently responsive. In other instances, for example, where campaign targeting relies on location-based signal data which may require a more timely response, incoming data may be checked against the campaign criteria in real-time. It may also be possible to process the remaining data sources in advance, so as to reduce the computation that may need to be performed in real-time, which may ensure a better quality of service.

Applications 140 may facilitate customer interactions that are supported by the offer recommendations, customer tags, and/or customer genome in the storage layer 120. Customer facing mobile and web applications 140 may be able to interact directly with the service interface layer 130, which may be exposed to the application 140 via an API 132 management platform or through an enterprise service bus (ESB). For example, a mobile application may want to access the customer genome's content preferences API to filter the articles that are presented to the user via the mobile application. The mobile application may invoke an API call with an interaction-type of "article" where the set of articles that are returned may reference, or point to, the article stored in a content management system, which can then be displayed by the mobile application.

Management functions may performed through a management console, which may, allow for management of data ingestion, whether from batch data 102, interactive data 103, or streaming data 104 sources, and configuration and maintenance of the service layer 130, for example, to implement different marketing campaigns. The management console may be implemented through a light-weight dashboard, for example, using HTML5 that may be built using Ember.js.

Figure 9:
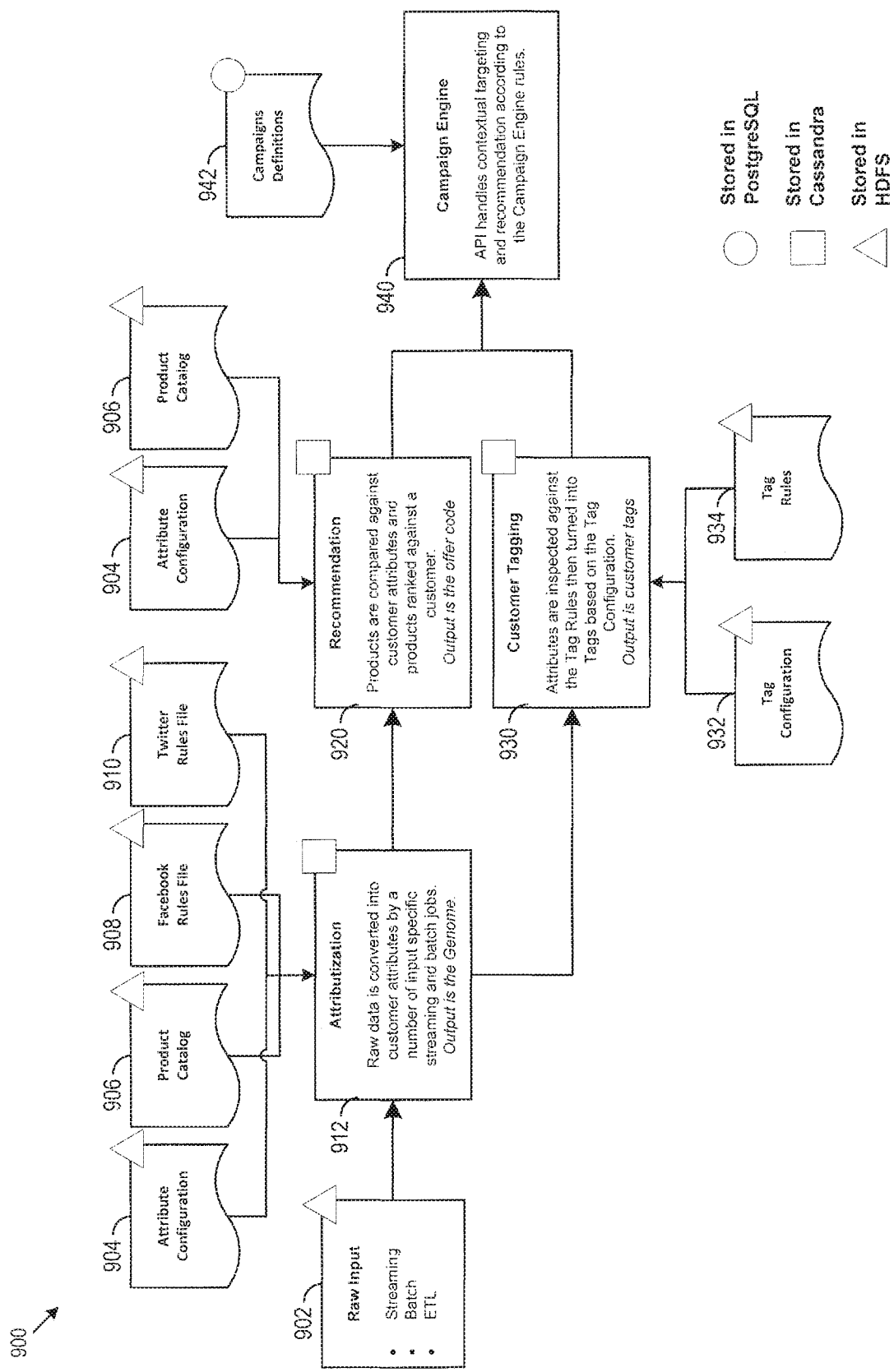
FIG. 9 shows an example customer genome processing architecture.

FIG. 9 shows an example customer genome processing architecture 900. In the example architecture 900, raw input 902 along with other inputs including predetermined attribute configurations 904, product catalogs 906, Facebooks rules files 908, and Twitter rules files 910, are provided to attributization logic 912. The attributes determined through customer genome construction are then passed to the recommendation logic 920 and the customer tagging logic 930. The recommendation logic may accept input from data sources including the attribute configurations 904, product catalogs 906, and/or other data sources. The customer tagging logic 930 may accept input in forms including tag configuration information 932 and/or tag rules 934. In the example architecture, the campaign engine 940 may direct customer interaction and usage of the customer genomes, customer tags, and offer recommendations, determined within the customer genome architecture. The campaign engine 940 may accept other inputs including campaign definitions 942. The campaign definitions 942 may be tailored to particular promotional events of priorities. Storage may be implemented on HDFS, Cassandra, and/or a relational database (e.g., PostgreSQL), and/or other databases and/or file systems. In some implementations, the customer genome may be stored in a Cassandra database and system configuration information, for example, interaction definitions or integrated system connection information, may be stored in a PostgreSQL database.

Figure 2:
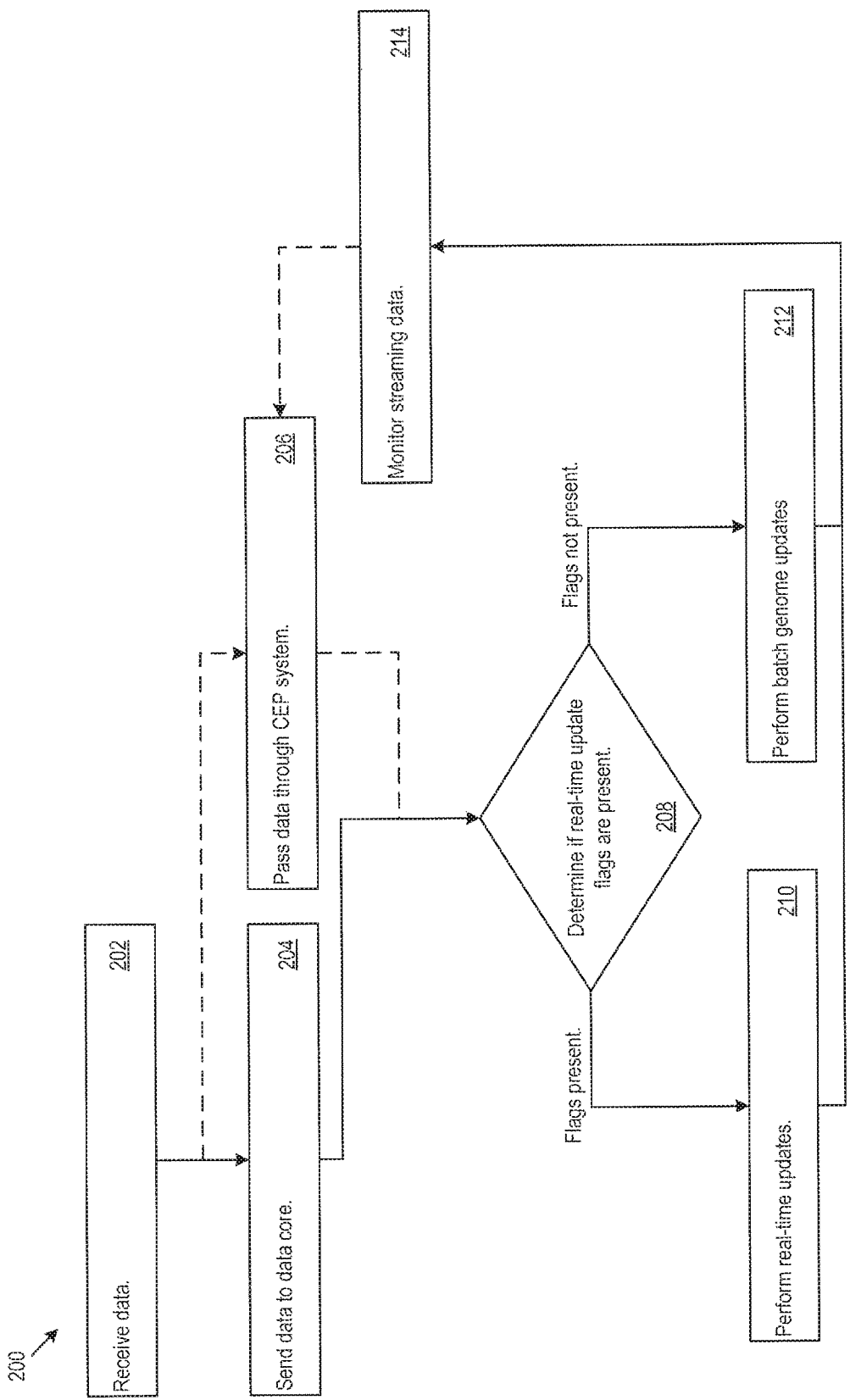
FIG. 2 shows example logic for data ingestion into the customer genome system.

FIG. 2 shows example logic 200 for ingesting data into the customer genome. The data may be received from multiple data channels in multiple ways (202). For example, the data may be batch uploaded, streamed, interactively received or received through another mode, e.g., via file transfer protocols, streaming data protocols, direct data entry, or other modes. In various implementations, batch data 102 sources may be delivered in the form of flat files for processing, and may be transferred to the data core 112 via an upload process through the management console. The batch data 102 sources may include, for example, social networking purchases, customer ID mappings, customer purchase histories, or product catalog data. The interactive data 103 sources may be accessed via web services at periodic intervals, on demand, or when required by the analysis logic 110. For example, the context engine 133 may detect that a customer has arrived at, or is present at, a particular location, and an interactive data 103 source may be queried (e.g., via a REST API) for information specific to the particular location (e.g., the temperature at the customer's location). Interactive data 103 sources may include, for example, weather service information or internet taxonomy information, which may be requested as needed. In various implementations, stream data 104 sources may be accessed via queues running on a Kafka broker, where data is posted to the Kafka queues via a web service, for example, via REST endpoints.

In some implementations, the batch upload process may send data to the data core 112 for genome construction (204). Alternatively or additionally, incoming streaming data may be passed over a network to a CEP system 114 (206). The CEP system 114 may check incoming data for certain flags that may indicate a genome update is required. For example, the CEP may determine if real-time update flags should be added (208). If update flags are present, the CEP system 114 may update that customer's genome and create new recommendations and assign new customer tags (210). Where the update flag is a real-time update flag, the customer genome may be updated and new customer tags may be assigned in real-time. If update flags are not present or after the genome has been updated to account for the flagged data, the CEP system 114 may send the received data to the data core 112 for genome updates or construction (212). The CEP system 114 may continuously monitor the streaming data (214). The updates to the customer genome may include customer genome initialization, additions, subtractions, and/or other construction or adjustment actions.

In various implementations, to support updates to business personnel for consumer interaction, businesses may use dashboards or reporting mechanisms that allow for a wide range of statistical, predictive, spatial and other advanced analytics tools. Since the data may be complex, personnel may be provided with automatically derived actionable insights. For example, an administrative user may have access to the full dashboard and a service clerk may receive actionable insights at a point-of-sale device. For instance, analytical reports on past customer behavior can be used to anticipate prospects and customer's buying preferences in order to help drive a change in future behavior.

As described above, the system may provide for a structured approach to understanding an individual customer and may build a customer genome, having individual customer profiles that describe various customer attributes or traits. The customer genome may be built by capturing data from traditional and alternative data sources, and may enhance the customer profile by using derived data. The traditional data sources may include, for example and without limitation, customer demographic information, purchase history, and loyalty program data, alternate data sources may include, for example, social data, location-based data, or community-based data, and the derived data may provide static and/or dynamic insights regarding an individual that may be obtained based on an analysis of the traditional and alternate data. The derived data may include, for example, insights regarding how to engage with a particular customer, their preferred engagement channel (online, mobile and in-store), their price sensitivity (e.g., average product price, coupon use, or participation in specific sale events) along with other influencers (e.g., celebrities, brands, family or friends) that capture customer-specific traits.

Traditional data sources may include data sources that are traditionally used by businesses to create marketing campaigns. As noted above, traditional data sources may include transactional or business data, such as demographic information, product catalog data, point-of-sale transaction details, loyalty card data and customer survey results. The transactional and/or business data may be used to generate the outline of the customer genome, which may be refined based on alternate data sources and derived data. In some implementations, a machine learning approach may be used to process traditional data. For example, a rule based machine learning approach may correlate transaction data (e.g., a customer's purchase history) against other traditional data sources (e.g., demographic information). Machine learning models, for example, may be trained using transactional data for customers with known demographic information, which may then be used to infer demographic information for anonymous customer transaction data, for which no demographic information is available.

In some cases, product catalog data may be the most robust data source available to a business, as the organization typically has greater control or access to this information. By looking at product meta-data alongside customer transactional data, the customer genome may be able to identify underlying patterns in the customer's purchasing behavior, which cannot be captured using traditional segmentation and association rules. In the following discussion, examples are discussed with reference to a grocery store product catalog, but the invention is not thus limited and may naturally extend to other contexts.

In various implementations, product catalog data may be processed to form an extensive data structure of individual products. For instance, product catalog data may be processed to identify different product categories, and may capture product meta-data for each product in each product category. The product meta-data may include different attributes of the product, where the product attributes that are captured may be specific to a particular product category. By way of example, a tooth paste may belong to the "personal care" product category and may have the following attributes and corresponding values: unique ingredients, "cinnamon flavor, xylitol," product purpose, "brushing teeth," additional benefits, "tooth whitening," price tier, "low/med," packaging, "white, box," natural ingredients, "yes," brand type, "small scale, domestic." Similarly, sweet potato pancakes may belong to the "processed foods" product category and may have the following attributes and values: unique ingredients, "cinnamon flavor, sweet potatoes, whole grain flour," frozen/fresh, "frozen," additional benefits, "beta carotene, vitamin A," allergens, "eggs, milk, soy, wheat," price tier, "med," certifications, "kosher," brand type, "small scale." While traditional association rules may not associate personal care products (i.e., tooth paste) with processed food products (i.e., sweet potato pancakes), the product catalog data shows that they have common ingredients (i.e., "cinnamon flavor") and fall within the same price tier. By incorporating these extensive product data structures into the customer genome, businesses may be able to see products and customers differently, observing deeper connections in customer behavior that were not previously visible (i.e., connections that go beyond the product category or SKU level).

To that end, product data may be analyzed alongside transactional data to derive certain customer affinity preferences that may form part of the customer genome. These customer affinity preferences may be determined based on an analytical model, which may look at the frequency at which a particular product is purchased and the relative share (e.g., as a percentage) that this purchase represents with respect to a product category or the user's purchases overall. The analytics may also compare the customer's purchasing patterns to that of a broader group, or the entire customer population, to determine whether the customer's purchasing habits are unique in a relative sense. The affinity preference may be represented as an affinity score, where individual affinity scores may be normalized or indexed to a scale of 100, which may facilitate comparisons between affinity preferences. Continuing with the previous example, a customer's purchase of the toothpaste and pancakes may lead to the insight that the particular customer has an affinity to cinnamon products or smaller scale producers. A more complete picture of the customer may emerge over time as additional transactions are conducted. For example, by processing the transaction history of a customer "Bill" along with the product catalog data, the following attributes and values may be included in his customer genome: percent of purchases in produce, "52%," chooses organic when available "68% more likely to buy organic," gender/age, "male/55-64," household size, "1," budget index, "70% more likely to purchase mid-tier," and fresh/frozen, "79% more likely to buy fresh" and may be identified or tagged as "an organic shopper" on "a moderate budget." These derived affinity preferences or customer attributes may be incorporated into the customer genome, and may allow for more personalized offerings.

In some implementations, the transactional data and product data may be combined to form a dataspace which may be further analyzed, for example, using term frequency-inverse document frequency analysis to determine an affinity score for different attributes for a particular customer. The affinity score may be calculated by applying the following generalized equations:

$$tf(t, d) = 0.5 + \frac{0.5 \times f(t, d)}{\max\{f(t, d) : t \in d\}}. \qquad \text{Eq 1}$$

$$idf(t, D) = \log \frac{N}{|\{d \in D : t \in d\}|}. \qquad \text{Eq 2}$$

The term frequency element may be thought of as an augmented or modified frequency, which helps to prevent a bias towards more extensive transactional history records. For example, the term frequency element may look at a particular customer (d) and attribute (t) in the transactional data-product data dataspace, and may adjust the frequency in which a particular attribute appears in the customer's transactional data based on the maximum frequency that any attribute appears in the customer's transactional data. The inverse document frequency may measure how much value an attribute should be given, based on whether it is common or rare across all customers (D). The inverse document frequency may be calculated as the logarithimically scaled fraction of the total number of customers having the attribute in the transactional data-product data dataspace and the number of times the attribute appears in the transactional data-product data dataspace of a particular customer. The term frequency and inverse document frequency may be combined (e.g., via multiplication) to calculate the affinity score. While the above description was provided with regards to the transactional data-product data dataspace, it may naturally be extended to other dataspaces formed by combining different data sources.

The number of attributes that may be needed to identify a unique pattern in a customer's behavior may vary from case to case (e.g., requiring 40-80 unique or common attributes to describe each product category), and may also vary in how artfully the products have been tagged (i.e., specific descriptors may be more likely to produce a unique match). The number of attributes that are identified may balance the expense in obtaining product data with the predictive ability that such information may have.

While these attributes may uniquely characterize an individual customer, there may be other customers having similar attributes and traits and customers may be grouped based on these traits. This type of segmentation may be viewed as bottom-up segmentation, where the grouping is based on individualized traits or attributes of a customer, which may be contrasted with traditional top-down segmentation where a broad group of customers is identified, for example, based on demographic data, and customer traits or attributes are approximated.

In generating offers, the product attributes may be matched against customer affinity preferences in the customer genome, which may provide more meaningful recommendations when compared to typical association rules. The matching process, for example, may match the affinity scores of a particular customer with the product attributes of a product included in an offer by calculating a cosine similarity score using the following generalized equation:

$$\text{Cosine Similarity Score} = \frac{A \cdot B}{\|A\| \, \|B\|}. \qquad \text{Eq 3}$$

Continuing with the previous example, a customer may have an affinity towards products that have berry flavoring, which may be captured in the customer genome based on the past purchase of raspberry scones, raspberry waffles, and raspberry cereal, and an affinity towards high-protein products, which may be captured in the customer genome based on the regular purchase of protein powder. Based on these attributes, a recommendation may be generated for raspberry (or other berry) Greek yogurt, which is high in protein and has berry flavoring. Such a recommendation may also depend on whether the customer has purchased dairy products, or dairy alternatives (e.g., soy milk), in the past. These recommendations may reflect deeper insights regarding the customer, which are not traditionally captured. The product recommendation may also be shaped by specific business goals of the organization. For example, a grocery store may desire to guide people towards the center of the store (as customers may tend to stay on the periphery) where specialty products are placed, and may select a product for recommendation, from a set of matching products, that are physically located at a particular location within the store.

As noted above, product catalog data may be the most robust source of information available to a business. In some cases, businesses may look to build a product catalog, or augment an existing product catalog to include additional or different attributes, which may result in better identification of customer affinity preferences. Additionally, or in the alternative, a business may make use of image processing and natural language processing techniques to capture information from product packaging, brochures, user guides, or the like. By way of example, natural language processing may be able to identify the ingredients listed on product packaging (e.g., "This product contains: sugar, xanthan gum, and raspberry."). A business may also be able to abstract the terms to identify attributes more broadly by using a dictionary or ontology. For instance, an ontology may define various concepts (e.g., flavors, nutrients, etc.) along with constituent terms (e.g., raspberry flavoring, vitamin D, etc.), and by comparing the information extracted from the product packaging to the ontology, may be able to identify a product attribute (e.g., identifying "raspberry" as a "flavor" present in a chewing gum product).

Traditional data sources may include data from different enterprise systems, including for example, internal customer relationship management (CRM) systems, enterprise resource planning (ERP) systems, ecommerce systems, and relational database management system (RDBMS) warehouses. As more specific examples, CRM and enterprise data may include data from warehouses, such as Oracle, IBM Netezza, Pivotal Greenplum and Teradata, enterprise resource planning and cloud-based applications, such as Salesforce.com and Marketo, NoSQL databases, such as, MongoDB, and documents and spreadsheets. Additionally or alternatively, customer and market data may be available through companies that specialize in providing these services, which may serve as another data source. For example, Experian household or other reporting agencies may provide demographic and segmentation data, and Dun & Bradstreet or other market research firms may provide business firmographic data. Public data, which may be available through governmental agencies (e.g., US Census Data), may also be used.

Alternate data sources may include data sources not commonly used today for customer segmentation along with data that may fall beyond a business's borders, for example, including data found on social media, community forums, and location-based information. For example, alternate data sources may include social media data from Facebook, Twitter, Foursquare, Instagram, Pinterest, Yelp, or Trip advisor, or community based forums (MacRumors.com, Slickdeals.net, FatWallet.com), or other popular consumer sites. This type of data, referred to generally herein as "social media" data, may be accessed using web crawling techniques or through social sign-on (e.g., Facebook application integration), and may help businesses derive more powerful insights that may help in better understanding the behavior, attitudes and opinions of individual customers.

Social media data (e.g., social media profile information) may be attached to the customer genome, and may be processed to infer preferences of the customer. In some implementations, a machine learning approach may be used to process the social media data, which may be able to identify customer attributes based on a relatively small set of data inputs (e.g., 4-5 Facebook "likes"). In some implementations, the machine learning approach may be rule based, and may correlate transaction data (e.g., purchase information) against social medial data (e.g., Facebook "likes"). In addition, or in the alternative, a clustering algorithm may be applied to the social media data to identify relevant groups of people. In an example scenario, a business may use social media data to derive a customer's opinions from that customer's closest social connections. For example, a restaurant trying to attract a new customer could leverage the opinion of a prospective customer's friends, for example, through the comments they make on the customer's social media profile about their experience at the restaurant, in order to persuade the customer to eat there. As another example, social media data may be used to understand how customers prefer to engage with particular brands or products. For example, customers might "like" and "share" products, but not comment on them, or they might enter in sweepstakes, but not redeem coupons. A business may use these insights to sell a product, or work to increase customer loyalty by appealing to an individual customer's preferences.

Alternate data sources may additionally, or in the alternative, capture contextual information regarding a customer interaction, for example, weather information or location information. As a more specific example, alternate data sources may include data from TomTom or other geolocation service companies, which may provide geo-spatial data for location intelligence. As another example, data may be provided by indoor tracking technologies, including beacon technologies, Wi-Fi triangulation or cellular phone signals. Business can use this information to understand customer shopping habits or pinpoint micro-locations of customer interactions and interest. For instance, grocery store might use this information to make a clear path to food staples, such as milk and bread. Further, such staples may be organized following the order in which customers typically buy them. Similarly, a store may use the information to stage additional items in strategic locations for upsell purposes. As another example that takes into account the real-time context of the customer interaction, a grocery store could leverage location based data to deliver relevant content and coupons to a customer while he is in the aisle choosing between two brands of food. Alternate data sources may also include internal data sources or multimedia data sources. By way of example, a business may aggregate internal data, such as security camera footage, and process this data, using video and image processing, for example, using facial recognition techniques and software, to pinpoint the locations and actions of customers at a particular location associated with specific products or product categories.

Traditional and alternate data sources may be accessed in a variety of ways using different data transfer mechanisms, depending on the method of implementation to construct or update a customer genome. In various implementations, batch data 102 sources may be delivered in the form of flat files for processing, and may be transferred to the data core 112 via an upload process through a management console. Batch data may include uploads of structured customer data provided by CRM systems. Similarly, master data management (MDM) or merchandise systems may provide access to product catalog data. With regards to social media, batch or scheduled uploads of social media data (e.g., Facebook data) may be provided through a public facing interface (e.g., Facebook API). Streaming data 104 may be provided from e-commerce or point-of-sale systems, where the streaming data may include transactions and actions of a customer. Streaming data 104 may also be provided through different public interfaces, for example, through Twitter's streaming API or Facebook's streaming API.

As mentioned above, traditional and alternate data sources may be used to generate derived data that may provide insights regarding a customer's behavior or identify distinctive attributes or markers regarding the customer, which the business may use to better engage the customer. By performing analytics on the traditional and alternate data, businesses can generate derived data that may lead to a variety of useful inferences about the customer that can be placed in their customer genome. For example, by looking at transactional data it may be revealed that a customer generally prefers shopping online over visiting brick and mortar stores, and that they are impulsive shoppers because they utilize rush shipping.

The customer genome may look at customer interactions in their broader context, for example, taking into account the time, location and conditions (e.g., weather) surrounding the interaction, to get a better understanding of the customer's behavioral patterns, which may be leveraged to provide a more personalized experience for the customer. For example, it may be possible to determine a customer's preferred channel of engagement or method of interaction. For instance, offer tracking and redemption data may reveal that promotional e-mails are not being opened or are being "unsubscribed," but text message and mobile application notifications are being consumed. Performing data analytics may also provide insights regarding a preferred context for customer engagement, for example, indicating a seasonal preference for purchasing products or a preference for responding during a particular time of the day. Data analytics may also look at offer redemption data to infer customer price sensitivities, observing that a customer is more responsive to one type of offer as compared to another (e.g., almost always uses a "40% off" coupon but rarely uses a "20% off" coupon).

Choosing the type of analytics to run will depend on the specific business case to be achieved, and based on a business's needs and priorities. To that end, a company may choose to selectively create customer genomes for a sub-set of the customer base who they plan to target. In an example scenario, a company may choose to create customer genomes for customers who have not purchased products or services from the company in the past year. In some cases, it may be advantageous to utilize certain aspects of a data source in real-time. However, in some cases, collected data may not necessarily include a time sensitive element, and non-time-sensitive data may be handled through batch processing. In some cases, batch processing may be associated with lower costs for a given processing task.

Figure 3:
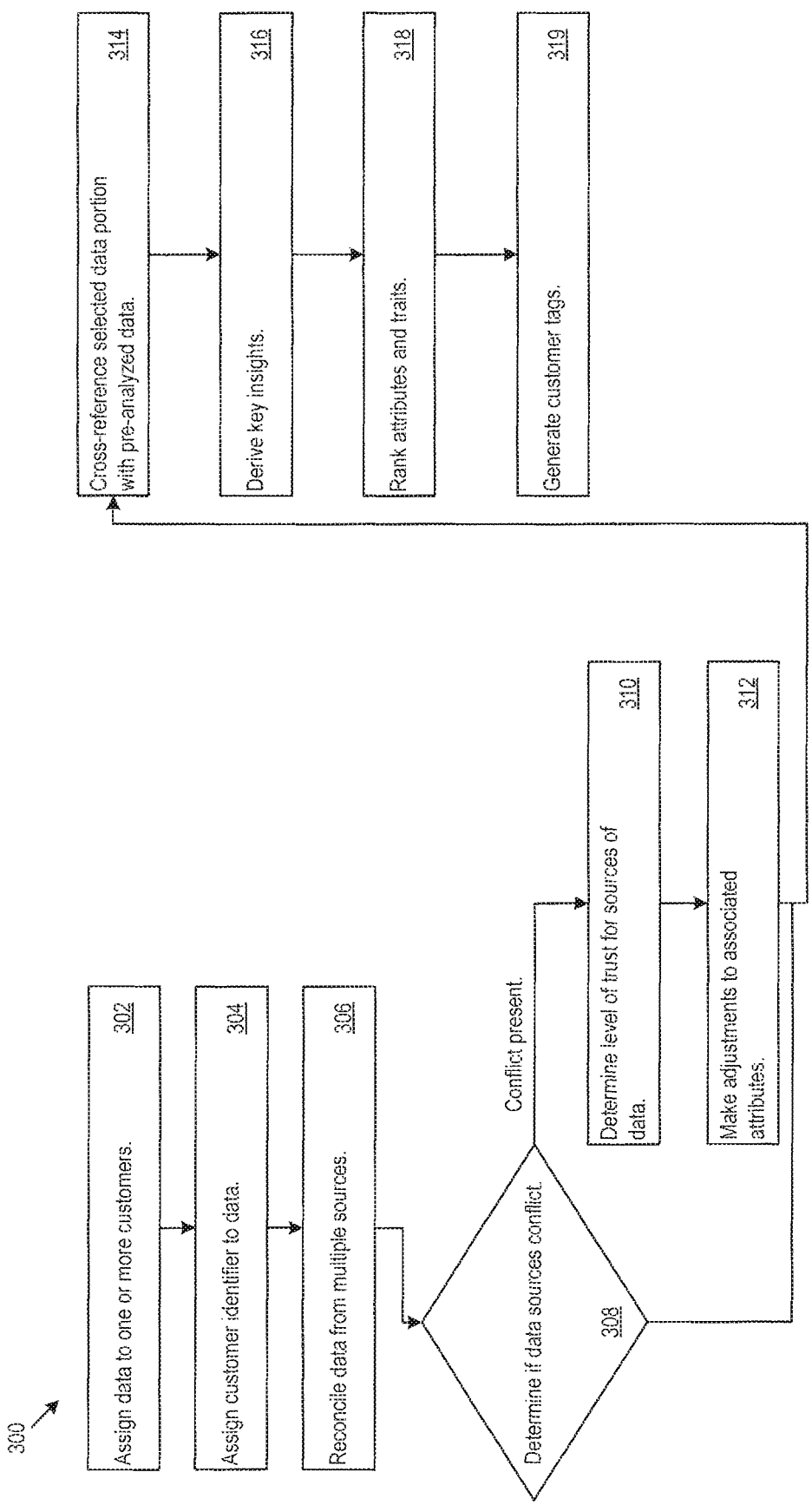
FIG. 3 shows example logic for customer genome construction.

FIG. 3 shows example logic 300 for customer genome construction. Data, once received by the data core 112 or CEP system 114, may be assigned, matched, or attributed to one or more individuals for customer genome updates (302). For example, the data core 112 or CEP system 114 may check for names, sources, and/or other identifiers to identify the one or more associated customer genomes. The data core 112 or CEP system 114 may then assign a customer identifier to the data (304). Afterward, the date core 112 or CEP system 114 may extract attributes for the customer genome from the data. By way of example, the extraction may be facilitated by first identifying the data source, and then determining a list of important attributes to extract from that particular data source.

Once the data core 112 or CEP system 114 extracts the important attributes, the logic may reconcile or prioritize data from multiple sources that may potentially describe the same customer (306). The logic 300 may perform reconciliation and prioritization to ensure that the data core 112 and CEP systems 114 have the most accurate data on an individual customer for inclusion in the customer genome. Data prioritization can be done through business rules. In some implementations, reconciliation and prioritization of ingested data may be performed by an orchestration engine.

The orchestration engine may first check to see if the two data objects are attributed to the same customer and may determine whether the data objects contain information regarding the same descriptive attribute for the customer 308. If there is a conflict, the orchestration engine may apply the business rules to determine the level of trust for the sources of the data 310. Once, the levels of trust for each source are determined, the orchestration engine may make adjustments to the associated attributes accordingly 312. For example, the attribute from the most trusted source may be selected. As a specific example, a social media data object (e.g., a Facebook relationship status) may be deemed unreliable based on demographic information of the user (e.g., young customers may use the relationship status field frivolously, for example, claiming to be "married" to a close friend), in which case information from a more reliable traditional data source (e.g., CRM system information) may be used to override the field. In other cases, the social media object (e.g., Facebook relationship status) may be deemed more reliable based on demographic information of the user (e.g., older customers use the relationship status field purposefully) and may override information from traditional data sources (e.g., CRM system information). Additionally or alternatively, relative weights may be assigned to the conflicting attributes such that one attribute may have a larger effect than another attribute. In various implementations, the business rules themselves may be assigned weights. In some cases, the more weight a given business rule has, the more likely it is that the customer genome will be updated in accordance with that business rule. Moreover, in some cases, for example, where there is no conflict, the attributes in question may be left unchanged. Additionally or alternatively, data prioritization may be implemented on an active learning engine. To support the active learning engine the analytics system, may be implemented in a staging environment where the incoming data that has been selected for reconciliation is sent. Users may prioritize or edit the customer data, and the active learning engine may monitor the user edits and/or re-prioritizations to determine the trust levels for different data sources and which sources are preferred for certain attributes or circumstances. In an example case, customer relationship management (CRM) data may be more trusted than Facebook data. In another example transactional data may be trusted more than demographic data. However, in various contexts, the opposite outcomes may be true and/or such sources may be trusted equally.

When a selected portion of the data has been analyzed, the ingested data may then be cross-referenced with pre-analyzed data 314. For example, pre-analyzed data may include attribute rules files, Facebook rules files, or other rules files. In an example scenario, the selected portion of the data may include batch data that has been sent to the data core 112 for processing, one or more flagged stream data items, and other data portions. The selected portion of the data, once cross-referenced with the pre-analyzed data, may undergo further analysis, which may facilitate derivation of key insights 316 about the consumer associated with the customer genome being formed. Such insights could include product interests, product attribute preferences, customer lifestyles, or favorite activities. The pre-analyzed data may be used to match customer behaviors with interests and attributes. The attributization process takes raw data, for example, from stream data or batch data sources, as an input and converts the raw data into customer attributes. The output is the customer genome, which correlates attributes with an individual. For example, the pre-analyzed data may include aggregate customer decision data. For example, such aggregate consumer decision data may include data points that 90% of customers who buy product 'X' are interested in camping, or that 80% of people of who like Brand 'A' on Facebook are also interested in travelling.

Once customer attributes have been calculated, the logic 300 uses business logic to rank the attributes and traits 318 of an individual. The business logic may incorporate the priorities of the entity that manages the customer genome in ranking the attributes. For example, the business logic may incorporate the business goals of a company and/or its clients, and may prioritize customer attributes in accordance with these goals.

As noted previously, the customer genome architecture may also facilitate the creation of customer tags. Customer tags in contrast to derived data may be assigned to customers based on an evaluation of all available data, whereas derived data may generally refer to an individual data point. In various implementations, the logic 300 may generate customer tags by utilizing business logic to determine which attributes are tagged to a customer after derivations have been made 319. For example, some derived attributes may not be important for the strategies that a particular business is seeking to implement, and the customer may not be tagged. As a more specific example, a chain of luxury boat stores may not be interested in a customer's preferences with regard to farming equipment. A derived attributed regarding the farming equipment area may not necessarily be tagged to a customer genome maintained for a luxury boat store.

In various implementations, the customer genome is dynamic and may be recalculated and/or updated periodically, on demand, in response to a trigger event, or at virtually any interval. In some implementations, for instance, the customer genome may set a baseline seed value for an attribute, which may be subsequently updated as data specific to the customer is ingested. For example, a customer's age may be known (e.g., based on social media profile information) and may be used to set a seed value for a 'typical' customer of that age. However, as previously noted, this top-down segmentation approach may not accurately capture the customer's preferences or be predictive of the customer's behavior. As additional data is received (e.g., subsequent transactional data), the baseline value may be adjusted, such that the attribute better characterizes the customer. In some cases, the customer genome may be updated in real-time or near real-time. In some cases, the customer genome may be updated in a batch process. In some implementations, a customer genome may be pulled, for example, based on a customer identifier, from storage and compared with incoming data. Attributes and traits may be identified in the new data using the logic 300. If old data is available, the old and new data may be compared.

In various implementations, if a newly derived attribute or trait does not currently exist in a customer genome, the attribute may be added to the customer genome by the business logic. However, in some cases, because the attribute is relatively new, the attribute may have a low certainty level attached relative to other older attributes. The certainty value of an attribute may be increased by the business logic in response to a successful offer that was provided to the user based on the attribute. Additionally or alternatively, certainty may change based on time, confirmatory derivations from other sources, and/or other indications of certainty. In some case, the attribute may receive a new certainty value based on a determination by the business logic that the new data may warrant a change in certainty value of an existing customer attribute. An update to the certainty attached to an attribute may cause the business logic to review the tagging information for the customer genome.

As noted previously, the customer genome may be updated over time to account for new information, where the updates may cause attributes to be treated differently over time. For example, a customer's age may be identified from social networking data, but the customer may exhibit behavior of a younger or much older man. Therefore, in some cases, attributes may be moved up or down in a ranking, or other effect hierarchy, based on the attributes predictive power. In some implementations, an attribute value may be adjusted downward from a reliable or verified value if another value is shown to have more predictive power for a given customer. In the example, where a customer has purchasing habits of someone that is much younger or older, the business logic may determine that another age value has higher predictive power than the verified age of the customer based on historical data. In the example, the business logic may alter the age value of the man to match the more predictive value. Alternatively or additionally, the business logic may add the more predictive trait as a separate attribute, and provide a weighting between the actual age of the customer and the most predictive age of the customer, such that the predictive value may have a greater influence than, and may even subsume, the verified trait.

As noted previously, contextual information, such as location information or marketing and engagement preferences, may assist in determining attributes or preferences of a consumer. For example, location information may be used to map out how a consumer organizes his life. For instance, location information may be used to deduce school or work schedules or preferred vacation destinations. In another example scenario, a business may determine activities of a consumer on a daily or weekly basis.

The predictive nature of the customer genome architecture may also be targeted at attributes related to consumer intent. The consumer intent type traits may include ethical beliefs, self-established goals, daily priorities, routines, family routine interactions, responsibilities, and/or other consumer behavior elements. To facilitate capture and deduction of such consumer intent type traits, businesses may build services around desired behaviors and capture data during the provision of these and/or other services and products. Further, businesses may use consumer intent type traits to provide supporting services to address frequent problems customers may experience. These data sources and services can then be used to deliver unique experiences for the customer that may increase their overall engagement.

Figure 10:
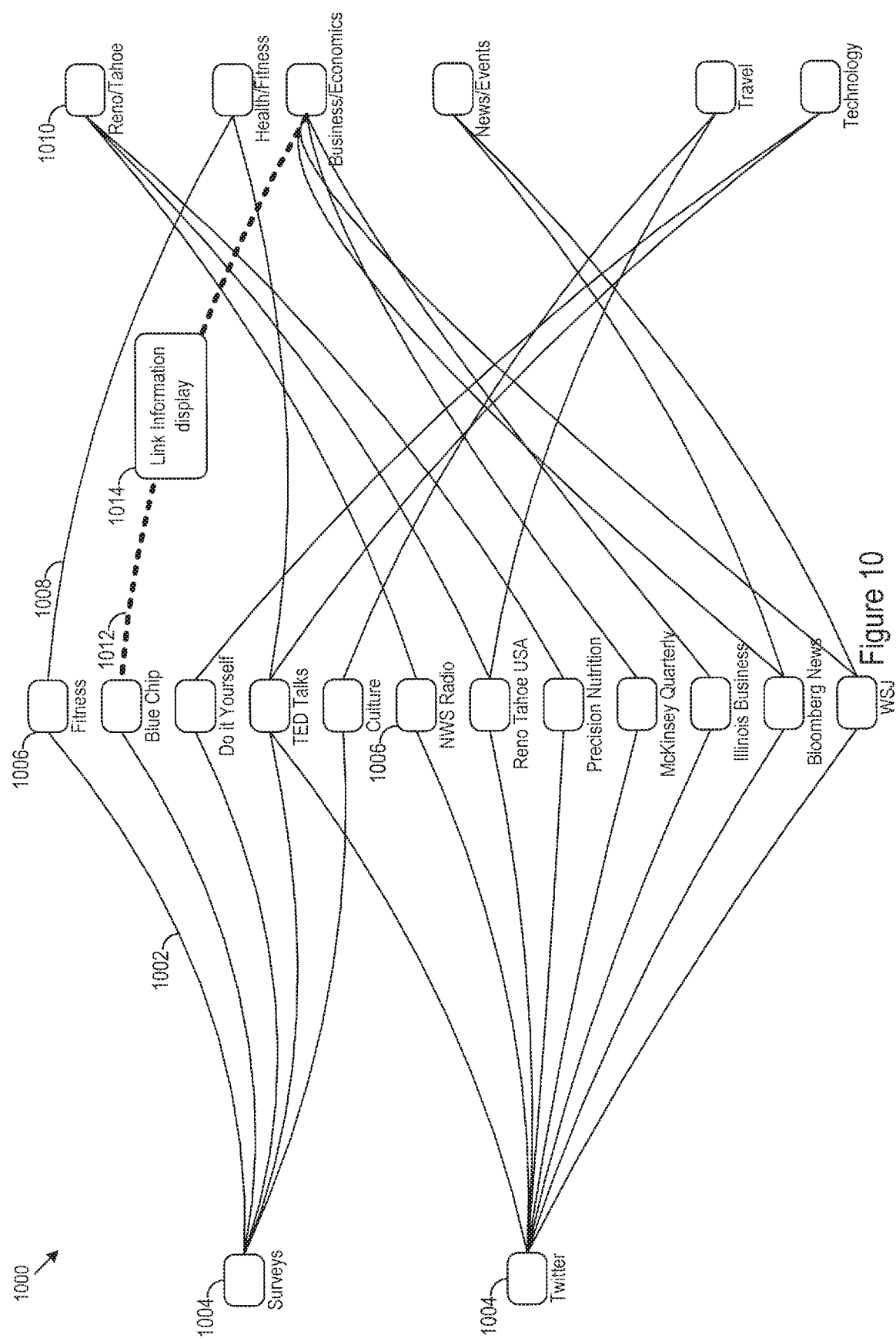
FIG. 10 shows an example visualization of a customer genome data linkage.

FIG. 10 shows an example visualization 1000 of a customer genome. The example visualization 1000 shows links 1002 from data sources 1004 to raw data 1006. The visualization also shows links 1008 to derived data 1010. Information displays 1014, such as tool tips, may be used to display information for selected links 1012 within the example visualization of the customer genome. For example, the link information display may be used to show the confidence level associated with the selected link 1012.

FIG. 11 shows an example table visualization 1100 of a customer genome. Entries 1102, e.g., data rows, within the genome may contain information regarding one or more attributes 1104. The information may include attribute categories 1106, values 1108 for the attribute, and certainty figures such as amounts 1110 and normalized amounts 1112. The categories 1106 may be used to define the breadth of offers that may be affected by a particular attribute. The amount 1110 may be used to determine the level of influence a particular attribute may have. The normalized amount 1112 may be used to determine the relative power or influence that an attribute may have relative to other attributes in the customer genome. For example, attributes in a given category may be normalized to one another. Additionally or alternatively, attributes may be normalized globally.

Figure 13:
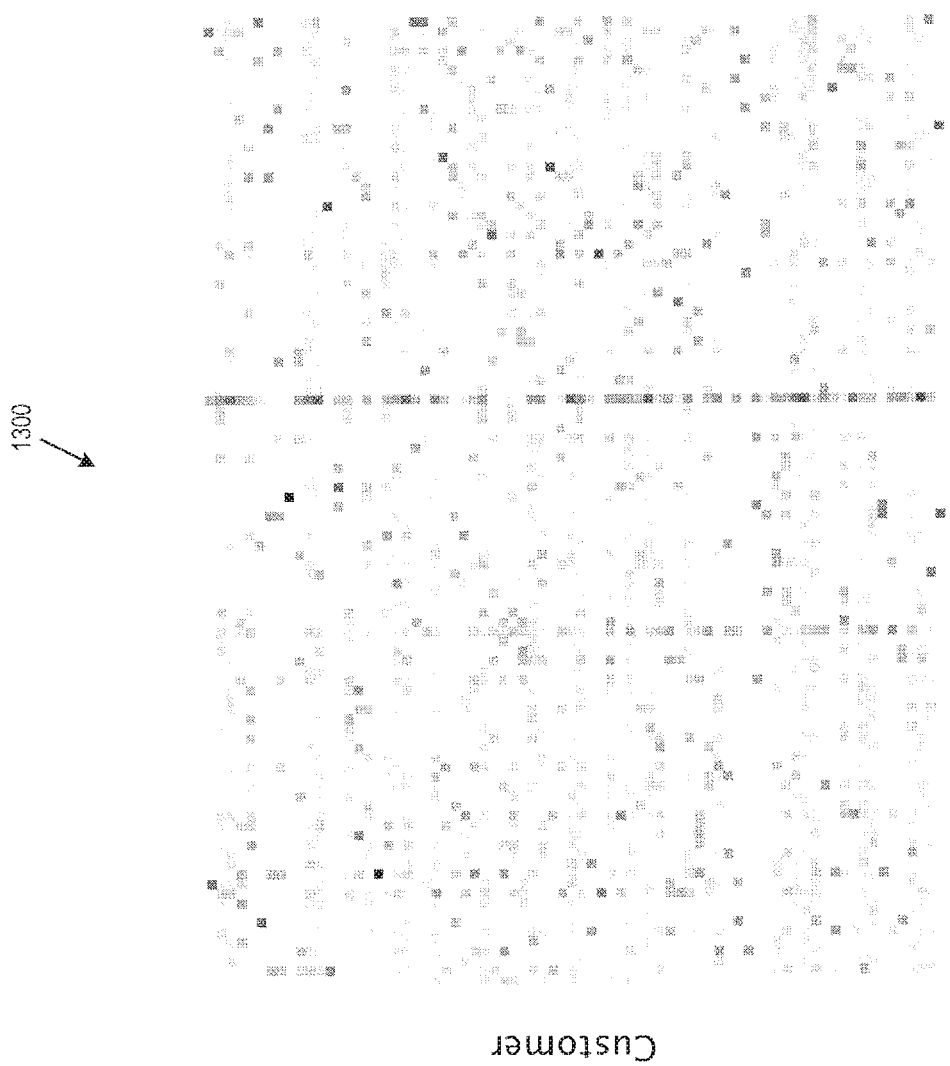
FIG. 13 shows an example of a customer genome heat map.

FIG. 13 shows an example of a customer genome heat map 1300, which may enable a visual comparison of customers and their attributes. An N×N heat map may show the top N customers and the top N attributes. As illustrated, the heat map is a 100×100 matrix. The greater the probability associated with the attribute the darker the color of the square. The heat map can be used to analyze customer behavior and to identify broader patterns across multiple customers of the customer genome.

Figure 4:
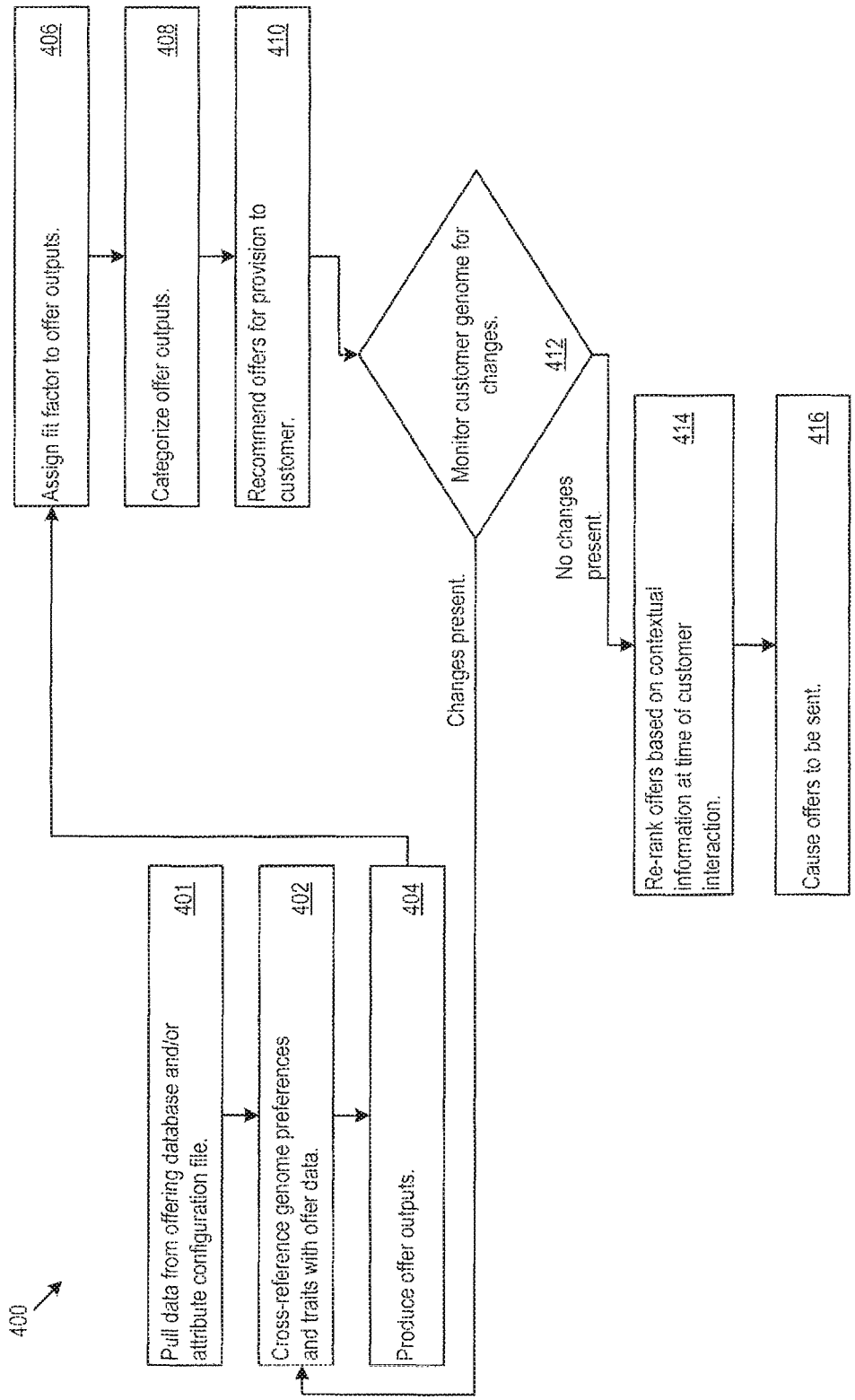
FIG. 4 show example logic for offer generation.

FIG. 4 shows example logic 400 for offer construction. Once a customer genome is created, the logic 400 may apply the customer genome to construct offer recommendations. To build the offer recommendation, the offer logic 400 may pull data from an offering database, which may contain a pool or set of generalized offerings, and an attribute configuration file (401). The attribute configuration file may contain configuration information at an attribute level, for example, specifying whether an attribute should be considered for an offer and to what degree it should influence provisioning of the offer. For example, the attribute configuration file may specify whether an attribute should be considered cross-category or whether it is applicable to particular categories. For instance, a bulk purchase attribute (i.e., indicating a preference to purchase things in bulk) may apply to toilet paper, but not to other categories like fresh produce. The attribute configuration file may also contain exclusionary rules, which may exclude certain customers from a particular offer. For example, a product offer for peanut butter based on the attribute configuration file may exclude customers having a peanut allergy.

The logic 400 may cross-reference the preferences and traits in a customer genome with the offer data to determine which offers are relevant (402). In some implementations, the offer data may reflect what people with certain traits and purchase histories are likely to buy in the future, and may be based on past observations of the customer or similar customers. For example, the offer data may include data indicating correlations among different products and services. For example, a given offer datum may indicate that a customer's use of Crest™ toothpaste and a preference for camping tends to suggest that the customer is likely to wear flannel shirts.

Based on the cross-reference between the customer genome and the offer data, the offer logic 400 may produce one or more offer outputs 404. Based on the level of correlation, the offer logic may assign a fit factor to the offer outputs 406. The offer logic 400 may categorize the offer output 408 based on the fit factor.

The offer outputs generated by the offer logic may include regular offers and extended offers. In some implementations, the offer logic 400 may determine regular and extended offers in parallel. For the regular offers, the offer logic 400 may match offers from the offer database with attributes and affinities from the customer genome. Regular offers may include offers that highly correlate to a customer's genome profile. In some cases, regular offers may include purchases that the customer has previously engaged in or has expressed interest in on venues such as social media. Extended offers may include offers that are slightly outside of a customer's profile, which still have a high chance of redemption by the customer. In some implementations, predetermined fit factor thresholds may be used to categorize the output. For example, fit factors above a first threshold may establish regular offers and fit factors below the first threshold but above a second threshold may establish extended offers. The invention is not thus limited, and any number of offer categories, having any number of thresholds including relative thresholds may be applied by the offer logic 400, which may conform to the level of granularity desired for the particular business purpose(s) of the offer recommendation system.

Figure 5:
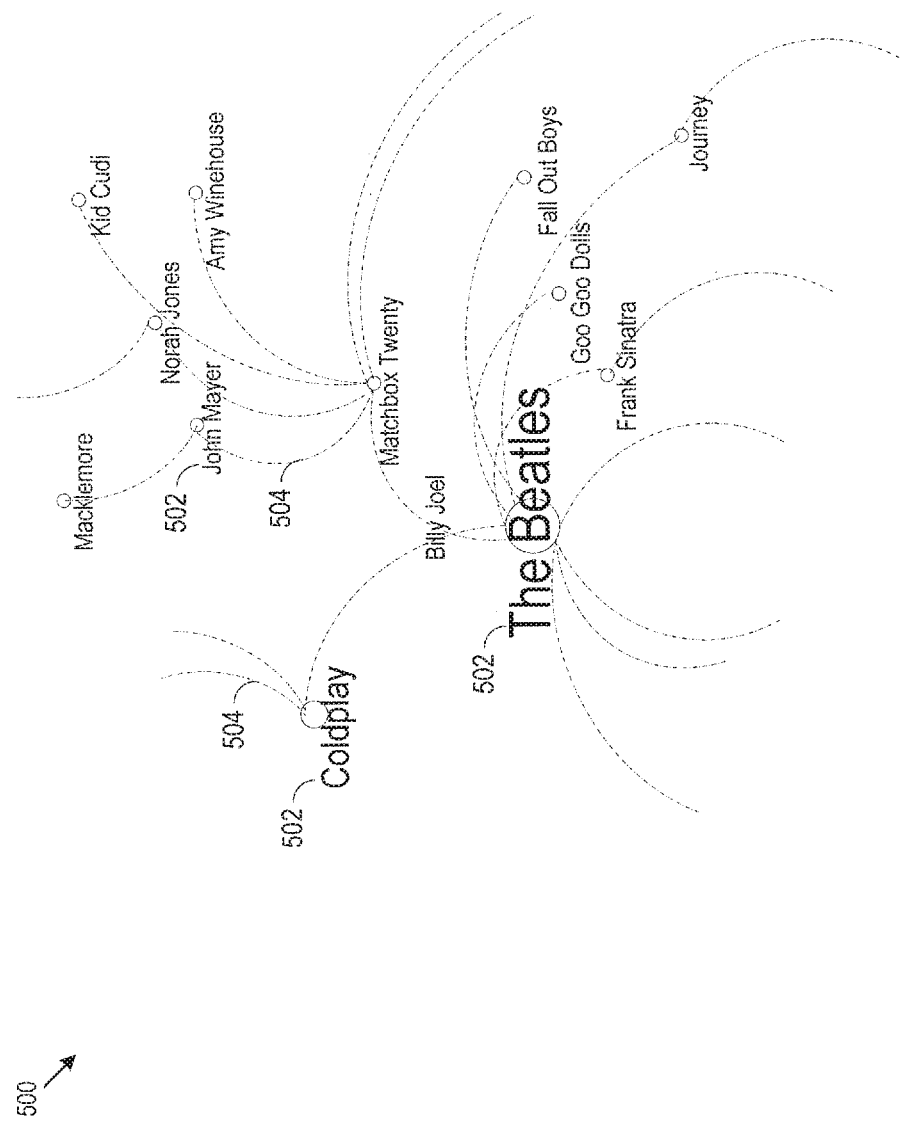
FIG. 5 shows an example transaction mapping.

In some implementations, the offer logic 400 may include a transaction mapping derived from previous customer transactional data, which may be used in identifying the extended offers. FIG. 5 shows an example transaction mapping 500. The nodes 502 in the transaction mapping 500 may correspond to the offers, and the weight of the edges 504 between nodes indicate the probability a second offer is accepted assuming acceptance or redemption of an offer at a first node. In the example transaction mapping 500, the offers 502 pertain to music purchases. However, the transaction mapping 500 may be applied in other business contexts as well. The offer logic 400 may identify nodes that the customer has purchased in the past and find items that are 'one-hop' away. In some cases, the offer logic may apply a purchase probability threshold and reject one-hop offers with probabilities below the threshold. In some cases, the transaction mapping may identify non-intuitive, but substantial correlations between various offers.

Additionally or alternatively, offers may be categorized as contextual offers. In various implementations, contextual offers may be offers having a contextual parameter or flag, where the contextual offers may normally fail to meet the conditions used to define regular or extended offers but in the proper context would meet, or exceed, these conditions. For example, a customer may be unlikely to purchase a product (e.g., an umbrella) when certain conditions are present (e.g., it sunny), but may be likely to purchase the product when such conditions are not present (e.g., it is raining or cloudy). In this example, a well-timed contextual offer may alert the customer of the ease at which they could obtain the product, which may compel the customer to purchase the product. A contextual offer may also require a particular contextual parameter to be valid (e.g., a location based parameter). For example, a given offer of interest may only be valid in certain regions (e.g., a particular set of stores or certain states). If the user travels to the region where the offer is valid, the offer may be recommended by the offer logic.

Once the offers have been categorized (e.g., as regular, extended or contextual), the offers may then be ranked based on importance to furthering business goals. For example, a clothing retailer may prioritize clothing style attributes while a book retailer may prioritize favorite book genres of the customer, which may be reflected in the offer rankings. The ranking may additionally, or alternatively, take into account the relevancy of an offer to the customer, for example, ranking the offers based on the level of certainty that the customer will want to take advantage of the offer. The offers may then be recommended for provision to the customer (410). The offer logic 400 may monitor the customer genome for changes (412), and when changes occur, the offer logic 400 may cross-reference the customer genome with the offer data (402) once more. In various implementations, the customer genome API may query the storage layer for the offer recommendations and/or tagging data when the customer interacts with a business. If present, contextual information regarding the customer's interaction, for example, the customer's location, may be sent along with, or as part of, the API request. Based on the contextual information, the offer logic 400 may re-rank or re-prioritize items (414). The offer recommendations may ultimately be provided to the customer, for redemption or use, or to businesses, to assess whether an offer recommendation should be provided to the customer (416).

FIG. 12 shows an example set 1200 of customer offer recommendations. In the example set, the offer recommendation entries 1202 include a product key 1204 and a recommendation score 1206. The product key 1204 indicates the product, service, recommended interaction, and/or other actionable insight associated with the offer recommendation entry 1202. The recommendation score 1206, indicates a level of success that may be expected with regards to the associated offer recommendation entry 1202. The level of success may be assessed relative to other entries or globally, reflecting a determination of the absolute probability of success.

When a customer interacts with a business, recommended offers may be presented to the customer. Offer recommendations may be pulled from the storage layer (e.g., a Cassandra cluster) when requested by the application programming interface (API) layer. The offer recommendations that are retrieved may include stored offer recommendations for the customer, offer recommendations based on configured campaigns targeted at selected customer tags, a combination of stored offers and tag targeted offers, or other recommendations.

Offer recommendations based on configured campaigns targeted at specific customer tags may be implemented using contextual APIs that send a specific set of offers preconfigured against a set of customer tags. For example, the API may be configured to send offer promoting new products to customers tagged as 'brand-loyal'. In some cases, an API may use a stored recommendation to execute a tag-targeted campaign. For example, a stored offer specific to respective individual customer genomes may be sent to customers tagged as not having interacted with the business in four weeks or more.

Recommendations may be provided to the customer is various contexts. For example, offers recommendations may be used by interface logic to construct a personalized landing page for a customer on a business website. For instance, an apparel retailer could use the customer genome to determine clothing size, fit, height, body shape, color preferences and/or current wardrobe of the customer. The determined details could be used to provide a more personalized experience by narrowing results for the customer, for example, only displaying shoes in the customer's size and budget instead of showing the entire inventory. A customized landing or other customized interaction with the customer may help insulate the business from interactions in which the customer feels that the relationship with the business starts anew at subsequent interactions. Furthermore, as the customer genome may be constructed using information from data sources external to the organization, a business may be able to give customers a customized feel to their interactions from the start, even in situations where the business has not previously interacted with the customer. In some cases, offer recommendations may be provided via text or media message. In various cases, offer recommendations may be provided via a mobile application. Offer recommendations may also be used to populate in-application (e.g., in-game or in-movie) advertising opportunities.

Recommendations may also be made to businesses, where the recommendations may indicate how best interact with a particular customer. For example, a dashboard may be provided to the business through which recommendations around offers and inventory movement may be provided. For example, some customers want one-on-one sales representative attention, and other customers may want to be left alone while they make their purchase decision. The recommendations, thus, may allow an employee of the business to be informed of the customer's preference prior to interaction with the customer. In some cases, interaction preferences may be implemented through the tag functionality of the system. For example, a customer tag set may include a tag indicating a preference for one-on-one sales representative attention.

Figure 6:
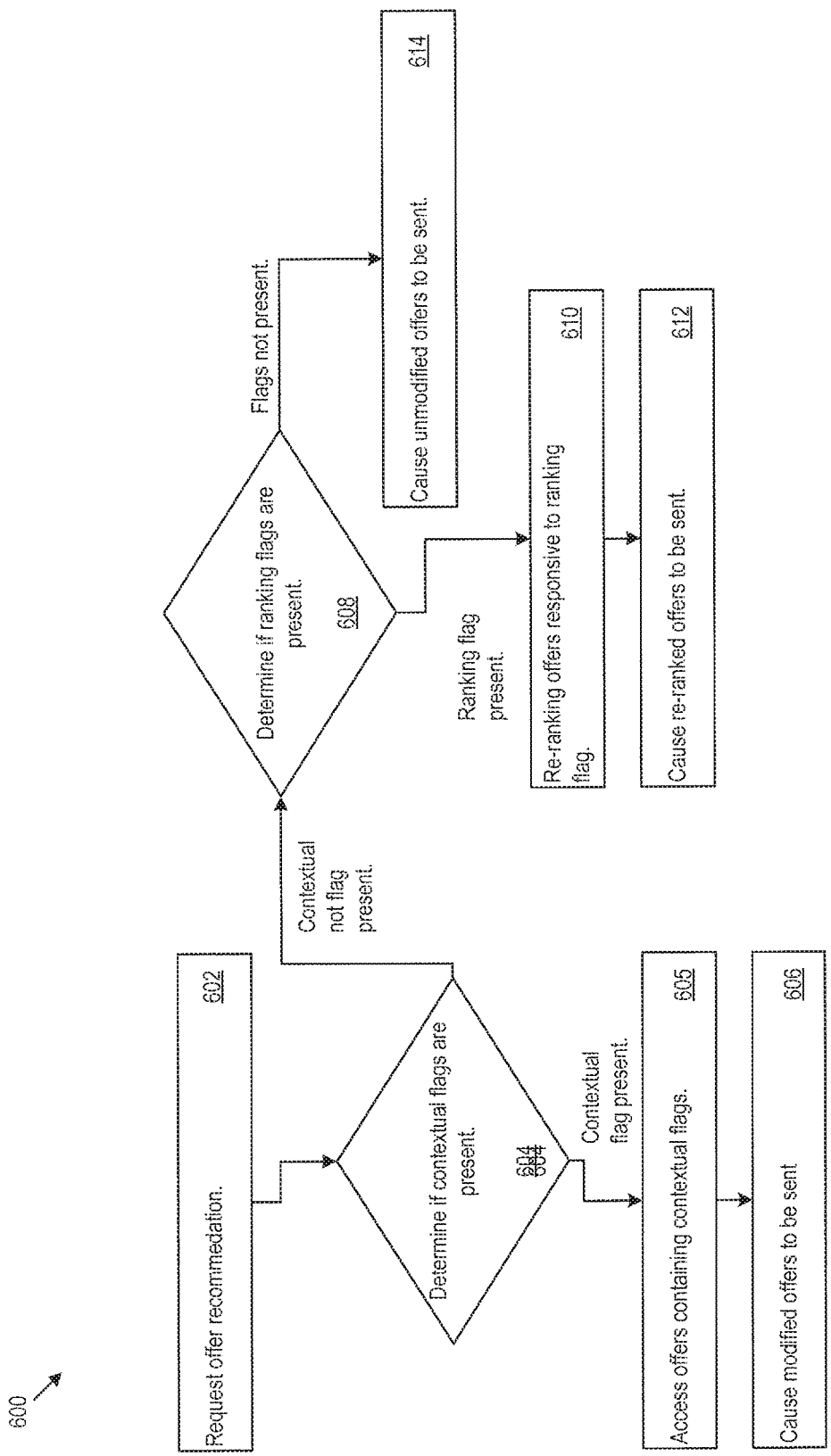
FIG. 6 shows example logic for interfacing with the genome system architecture and receiving an offer recommendation.

FIG. 6 shows example logic 600 for interfacing with the customer genome system architecture and receiving an offer recommendation. An API may request an offer recommendation based on activity at a customer interface (602). The logic 600 may determine if contextual flag exists within API request (604). Responsive to a contextual flag, the logic 600 may access offer recommendations that have the contextual flag (605). The logic 600 may then cause the items with contextual flags to be sent to the consumer interface in response (606).

The logic 600 may determine if API request contains a ranking flag (608). For example, the API request may specify ranking priorities relevant to the particular interaction that initiated the request. Based on customer's tags and recommendation, the logic 600 may re-rank items in the recommendation (610) to place items with contextual flags matching the API request to the highest priority in the offer recommendation. The logic 600 may cause modified offer recommendation to be sent to the consumer interface (612). If no flags are present, the logic may cause unmodified offer recommendations to be sent to the consumer interface in response to the request (614).

It may also be helpful for businesses to evaluate the effectiveness of the customer genome. Businesses, for example, may benchmark or validate the customer genome against past offer redemption data. Past offer redemption data may contain information regarding offers that were given to different customers or groups of customers in the past. This data may include information regarding whether the offer was opened or read (e.g., e-mail analytics), and whether the offer was accepted or redeemed. In validating the customer genome, past offer redemption data for a customer may be compared against offer recommendations generated for that customer using the customer genome in order to identify different strategies to employ or strategy changes that may be made. If different offers are recommended based on the customer genome, businesses may be interested in whether these recommended offers will be successful. Using past offer redemption data for the customer, or for a group of similar customers, business may be able to predict whether the customer is likely to redeem or accept the current offer recommendation.

Figure 7:
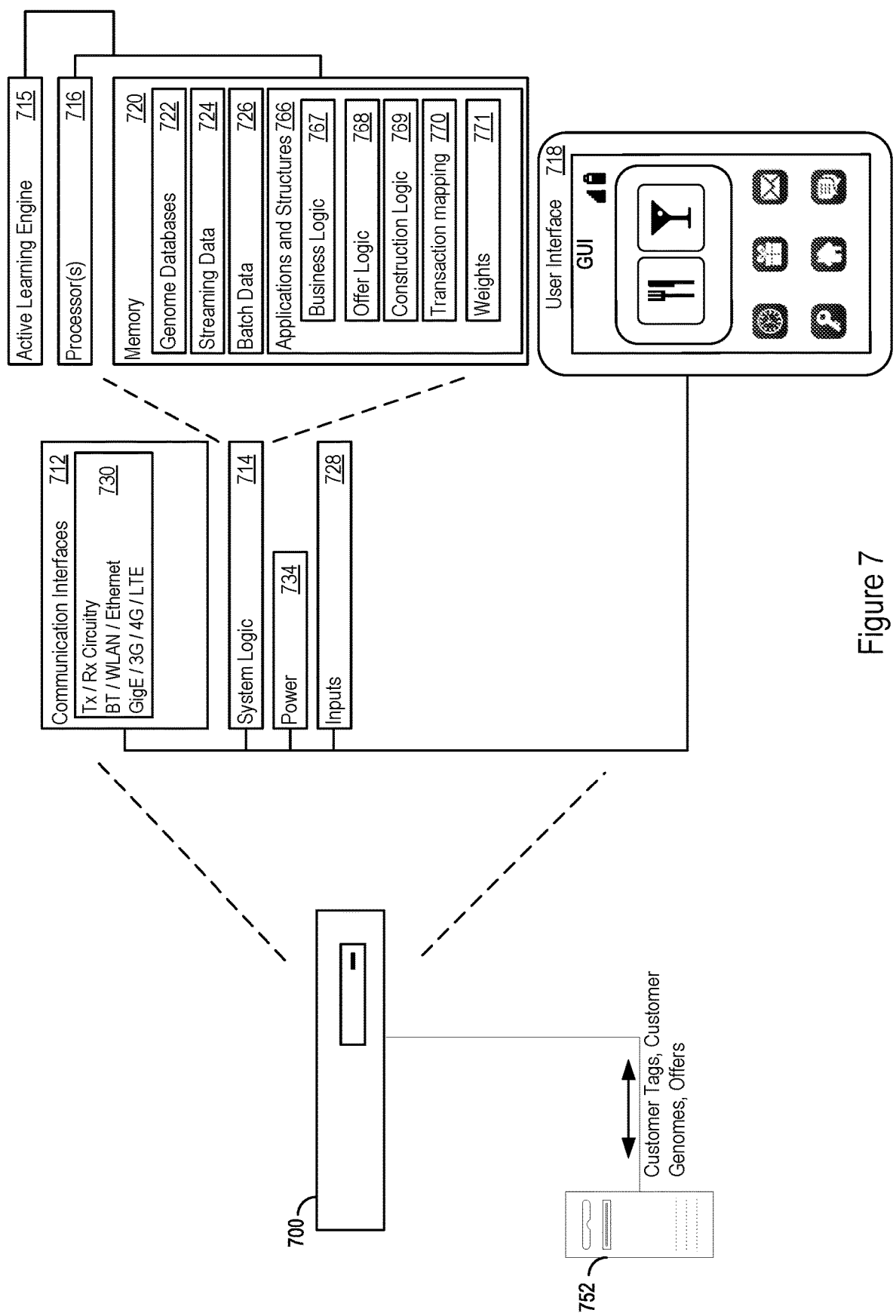
FIG. 7 shows an example specific execution environment.

FIG. 7 shows an example specific execution environment 700 for the logic (e.g. 200, 300, 400, 600), data core 112, CEP system 114, and/or other analysis systems described above. The execution environment 700 may include system logic 714 to support execution and presentation of the visualizations described above. The system logic may include processors 716, memory 720, and/or other circuitry. An active learning engine 715 may be implemented on the processors 716 and/or the memory.

The memory 720 may be used to store the customer genome databases 722 and/or incoming streaming 724 or batch data 726 used in the, data analysis, customer genome construction, customer tagging, and/or offer recommendation described above. In some cases, the memory 720 may be implemented using a distributed file system over one or more storage systems. For example, a portion of the memory 720 may be implemented on a Hadoop distributed file system (HDFS). The memory may further include applications and structures 766, for example, coded objects, templates, or other structures to support data analysis, customer genome construction, customer tagging, and/or offer recommendation. The applications and structures may include the business logic 767, the offer logic 768, the construction logic 769, the transaction mappings 770, and/or business rule weights 771. The memory may also support storage of elements obtained through external or third-party databases or data sources. In various implementations, the example execution environment 700, may connect to one or more databases 752 for storage of the offers, customer tags, and/or customer genomes.

The execution environment 700 may also include commutation interfaces 712, which may support wireless, e.g. Bluetooth, Wi-Fi, WLAN, cellular (4G, LTE/A), and/or wired, Ethernet, Gigabit Ethernet, optical networking protocols. The communication interface may support communication with external or third-party servers 752. The execution environment 700 may include power functions 734 and various input interfaces 728. The execution environment may also include a user interface 718 that may include human interface devices and/or graphical user interfaces (GUI). The GUI may be used to present a management dashboard, actionable insights and/or other information to the user. In various implementations, the system logic 714 may be distributed over multiple physical servers and/or be implemented as a virtual machine.

Figure 14:
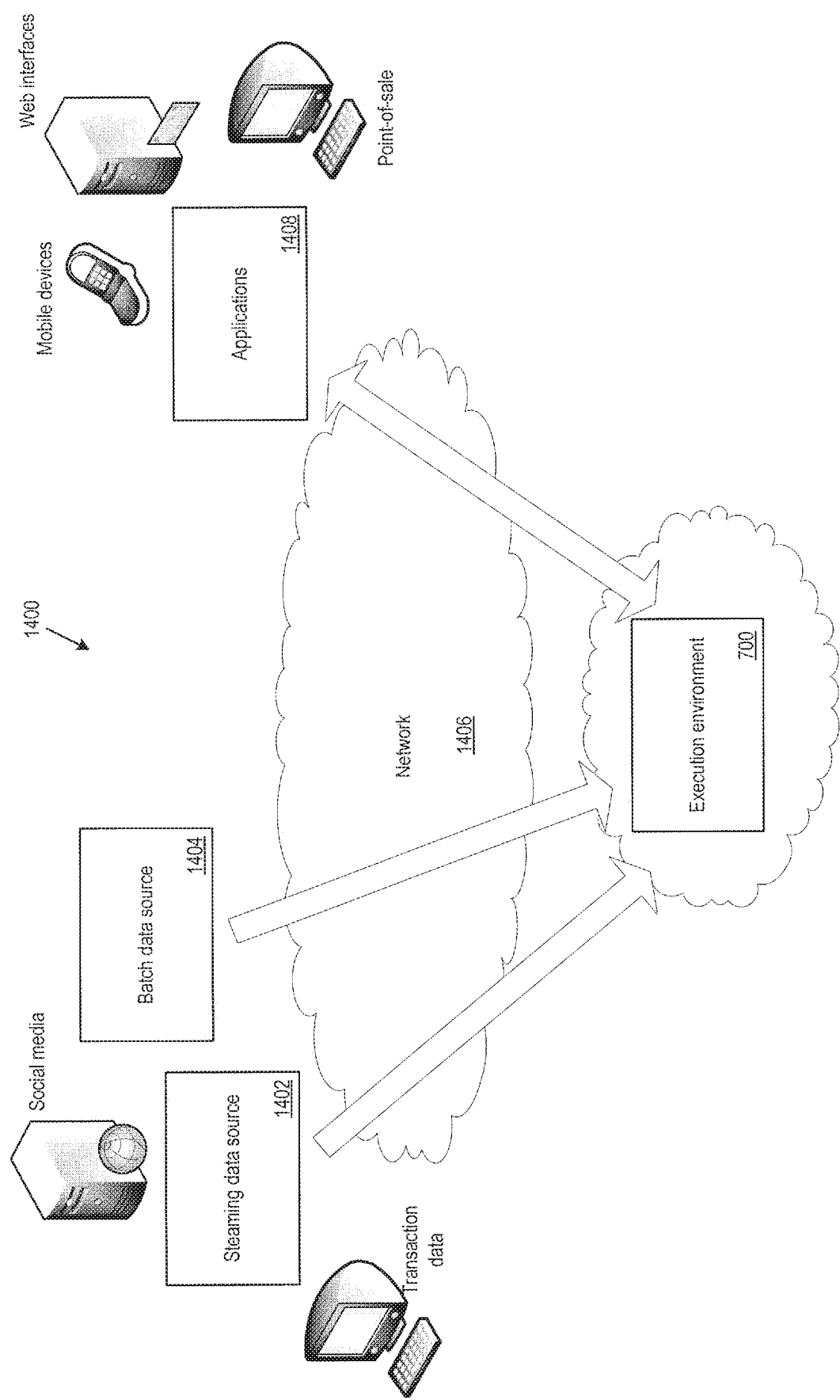
FIG. 14 shows an example network system environment.

FIG. 14 shows an example network environment 1400. Streaming 1402 and/or batch 1404 data sources may provide input to an execution environment 700 running logic to support the customer genome architecture. The data sources 1402, 1404 may interface with the execution environment over a network 1406 such as the Internet, a data center network, and/or other network. In some cases, the execution environment 700 may be distributed over a network to support the various functionalities of the customer genome architecture. Applications 1408 may access the insights, offers, tags, and/or other data of the customer genome architecture via the network. Applications 1408 may be run on devices such as customer genome management devices, point-of-sale devices, customer mobile devices, customer web-interfaces, and/or other devices used in customer interaction.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible and may be readily ascertained by a person of ordinary skill in the art based on the teachings described above. These implementations and equivalents thereof are illustrated by the examples described above and the scope of the invention should be determined not by the examples but with reference to the claims and equivalents appended hereto.

The invention claimed is:

1. A method for identifying physical items from location-based updates, comprising:
   receiving, by a processor, profile data from a plurality of data channels,
   accessing, by the processor, an attributization rule associated with at least one of the data channels, the attributization rules comprising instructions to convert the profile data into attributes for a robust recipient profile;
   converting, by the processor, based on the attributization rule, the profile data into the attributes and storing the attributes in a robust recipient profile associated with a recipient identifier, the robust recipient profile electronically stored in a database record in association with the recipient identifier;

identifying, by the processor, based on tag logic, tags that are associated with the attributes, wherein the tag logic comprises instructions to compare the attributes with predetermined attributes associated with the tags;

mapping, with the processor, in the robust recipient profile, the identified tags to the recipient identifier;

after mapping the tags to the recipient identifier the processor performing the steps of:

monitoring the plurality of data channels for data comprising real-time location information originated by a mobile device associated with the recipient identifier;

determining the mobile device is proximate to a physical object, the physical object being associated with at least one of the tags; and transmitting, in response to the mobile device being proximate to the physical object and the physical object being associated with at least one of the tags, offer information to the mobile device, the offer information comprising predetermined information descriptive of the physical object.

2. The method of claim 1 further comprising:

determining, based on the real-time location information, the mobile device has remained stationary for a predetermined amount of time, wherein the step of transmitting further comprises:

transmitting, in response to the mobile device remaining stationary for the predetermined amount of time, the mobile device being proximate to the physical object and the physical object being associated with at least one of the tags, the offer information to the mobile device.

3. The method of claim 1, wherein converting, based on the attributization rule, the profile data into the attributes further comprises:

generating an attribute based on a first set of profile data received from a first data channel and a second set of profile data received from a second data channel, the first set of profile data corresponding to a first user profile and the second set of profile data corresponding to a second user profile, the first user profile and the second user profile associated with a recipient corresponding to the recipient identifier.

4. The method of claim 1, wherein the robust recipient profile is updated periodically, on-demand, in response to a trigger, or a combination thereof.

5. The method of claim 1, wherein further comprising:

retrieving interaction metadata from a metadata database, the interaction metadata indicative of interaction with physical objects by a recipient corresponding to the recipient identifier;

deriving a transaction mapping based on the interaction metadata and the attributes, the transaction mapping comprising a plurality of nodes, the nodes representative of offer instructions and associated with corresponding physical object, respectively, wherein the nodes are separated by edges;

identifying, based on the interaction metadata and the transaction mapping, a first node associated with a corresponding physical object that the recipient has interacted with;

identifying a second node that is connected to the first node by at least one of the edges; and including an offer instruction corresponding to the second node in the offer information.

6. The method of claim 5, wherein the offer instruction is included in the offer information in response to the second node being representative of the offer instruction and the physical object associated with the second node being in physical proximity to the mobile device.

7. The method of claim 1, where the received profile data comprises traditional data, alternate data, or a combination thereof.

8. A system comprising:

a hardware processor and a memory, the hardware processor configured to:

receive profile data from a plurality of data channels, access an attributization rule associated with at least one of the data channels, the attributization rules comprising instructions to convert the profile data into attributes for a robust recipient profile;

convert, based on the attributization rule, the profile data into the attributes and store the attributes in a robust recipient profile associated with a recipient identifier;

the robust recipient profile stored in a database record in the memory in association with the recipient identifier;

identify, based on tag logic, tags that are associated with attributes, wherein the tag logic comprises instructions to compare the attributes with predetermined attributes associated with the tags;

map, in the robust recipient profile, the identified tags to the recipient identifier;

perform communication with a mobile device based on the robust recipient profile and a real-time location of the mobile device, where to perform the communication, the hardware processor is configured to:

monitor the plurality of data channels for data comprising real-time location information originated by a mobile device associated with the recipient identifier;

determine the mobile device is proximate to a physical object, the physical object being associated with at least one of the tags; and transmit, in response to the mobile device being proximate to the physical object and the physical object being associated with at least one of the tags, offer information to the mobile device, the offer information comprising predetermined information descriptive of the physical object.

9. The system of claim 8, wherein the hardware processor is further configured to:

determine the mobile device has remained stationary for a predetermined amount of time, wherein to transmit the offer information, the hardware processor is further configured to:

transmit, in response to the mobile device remaining stationary for the predetermined amount of time, the mobile device being proximate to the physical object and the physical object being associated with at least one of the tags, the offer information to the mobile device.

10. The system of claim 8, wherein to convert, based on the attributization rule, the profile data into the attributes, the hardware processor is further configured to:

generate an attribute based on a first set of profile data received from a first data channel and a second set of profile data received from a second data channel, the first set of profile data corresponding to a first user profile and the second set of profile data corresponding to a second user profile, the first user profile and the second user profile associated with a recipient corresponding to the recipient identifier.

11. The system of claim 8, wherein the robust recipient profile is updated periodically, on-demand, in response to a trigger, or a combination thereof.

12. The system of claim 8, wherein the hardware processor is further configured to:
receive interaction metadata from a metadata database, the interaction metadata indicative of interaction with physical objects by a recipient corresponding to the recipient identifier;
derive a transaction mapping based on the interaction metadata and the attributes, the transaction mapping comprising a plurality of nodes, the nodes representative of offer instructions and associated with corresponding physical object, respectively, wherein the nodes are separated by edges;
identify, based on the interaction metadata and the transaction mapping, a first node associated with a corresponding physical object that the recipient has interacted with;
identify a second node that is connected to the first node by at least one of the edges; and
identify an offer instruction corresponding to the second node in the offer information.

13. The system of claim 12, wherein the hardware processor is further configured to include the offer instruction in the offer information in response to the second node being representative of the offer instruction and the physical object being in physical proximity to the mobile device.

14. The system of claim 8, where the received profile data comprises traditional data, alternate data, or a combination thereof.

15. A non-transitory computer readable storage medium comprising:
a plurality of instructions executable by a hardware processor to:
receive profile data from a plurality of data channels,
access an attributization rule associated with at least one of the data channels, the attributization rules comprising instructions to convert the profile data into attributes for a robust recipient profile;
convert, based on the attributization rule, the profile data into the attributes and store the attributes in a robust recipient profile associated with a recipient identifier;
the robust recipient profile associated with the recipient identifier stored in the computer readable storage medium;
identify, based on tag logic, tags that are associated with the attributes, wherein the tag logic comprises instructions to compare the attributes with predetermined attributes associated with the tags;
map, in the robust recipient profile, the identified tags to the recipient identifier;
monitor the plurality of data channels for data comprising real-time location information originated by a mobile device associated with the recipient identifier;
determine the mobile device is proximate to a physical object, the physical object being associated with at least one of the tags; and
transmit, in response to the mobile device being proximate to the physical object and the physical object being associated with at least one of the tags, offer information to the mobile device, the offer information comprising predetermined information descriptive of the physical object.

16. The non-transitory computer readable storage medium of claim 15, wherein the instructions are further executable by the hardware processor to:
determine the mobile device has remained stationary for a predetermined amount of time; and
transmit, in response to the mobile device remaining stationary for the predetermined amount of time, the mobile device being proximate to the physical object and the physical object being associated with at least one of the tags, the offer information to the mobile device.

17. The non-transitory computer readable storage medium of claim 15, wherein to convert, based on the attributization rule, the profile data into the attributes, the instructions are further executable by the hardware processor to:
generate an attribute based on a first set of profile data received from a first data channel and a second set of profile data received from a second data channel, the first set of profile data corresponding to a first user profile and the second set of profile data corresponding to a second user profile, the first user profile and the second user profile associated with a recipient corresponding to the recipient identifier.

18. The non-transitory computer readable storage medium of claim 15, wherein the robust recipient profile is updated periodically, on-demand, in response to a trigger, or a combination thereof.

19. The non-transitory computer readable storage medium of claim 15, wherein the instructions are further executable by the hardware processor to:
receive interaction metadata from a metadata database, the interaction metadata indicative of interaction with physical objects by a recipient corresponding to the recipient identifier;
derive a transaction mapping based on the interaction metadata and the attributes, the transaction mapping comprising a plurality of nodes, the nodes representative of offer instructions and associated with corresponding physical object, respectively, wherein the nodes are separated by edges;
identify, based on the interaction metadata and the transaction mapping, a first node associated with a corresponding physical object that the recipient has interacted with;
identify a second node that is connected to the first node by at least one of the edges; and
identify an offer instruction corresponding to the second node in the offer information.

20. The non-transitory computer readable storage medium of claim 19, wherein the instructions are further executable by the hardware processor to include the offer instruction in the offer information in response to the second node being representative of the offer instruction and the physical object being in physical proximity to the mobile device.

* * * * *

UNITED STATES PATENT AND TRADEMARK OFFICE
CERTIFICATE OF CORRECTION

PATENT NO. : 10,867,311 B2
APPLICATION NO. : 16/242755
DATED : December 15, 2020
INVENTOR(S) : Christopher John Hawkins et al.

Page 1 of 1

It is certified that error appears in the above-identified patent and that said Letters Patent is hereby corrected as shown below:

In the Claims

In Column 13, in Eq 1, approx. Line 62, delete "." after the equation.

In Column 13, in Eq 2, approx. Line 65, delete "." after the equation.

In Column 14, in Eq 3, approx. Line 54, delete "." after the equation.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*